(12) United States Patent
Oh et al.

(10) Patent No.: US 10,168,461 B2
(45) Date of Patent: Jan. 1, 2019

(54) BACKLIGHT UNIT AND DISPLAY DEVICE COMPRISING SAME

(71) Applicant: LG ELECTRONICS INC., Seoul (KR)

(72) Inventors: Jinmok Oh, Seoul (KR); Byoungkwon Cho, Seoul (KR); Moongoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 39 days.

(21) Appl. No.: 15/321,643

(22) PCT Filed: Feb. 25, 2015

(86) PCT No.: PCT/KR2015/001798
§ 371 (c)(1),
(2) Date: Dec. 22, 2016

(87) PCT Pub. No.: WO2015/199310
PCT Pub. Date: Dec. 30, 2015

(65) Prior Publication Data
US 2017/0219759 A1   Aug. 3, 2017

Related U.S. Application Data

(60) Provisional application No. 62/018,275, filed on Jun. 27, 2014.

(30) Foreign Application Priority Data

Oct. 1, 2014   (KR) .................. 10-2014-0132549

(51) Int. Cl.
*F21V 8/00* (2006.01)
*G02F 1/13357* (2006.01)
(Continued)

(52) U.S. Cl.
CPC .......... *G02B 6/0026* (2013.01); *G02B 6/001* (2013.01); *G02B 6/005* (2013.01); *G02F 1/1336* (2013.01);
(Continued)

(58) Field of Classification Search
CPC ................................................. G02B 6/0026
See application file for complete search history.

(56) References Cited

U.S. PATENT DOCUMENTS

2005/0264715 A1* 12/2005 Kahen .............. G02F 1/133617
349/61
2007/0273265 A1* 11/2007 Hikmet ................. C09K 11/02
313/483
(Continued)

FOREIGN PATENT DOCUMENTS

JP         2013-105747 A    5/2013
KR     10-2012-0088273 A    8/2012
(Continued)

*Primary Examiner* — Sang V Nguyen
(74) *Attorney, Agent, or Firm* — Birch, Stewart, Kolasch & Birch, LLP

(57) ABSTRACT

A backlight unit including a light source formed to provide primary light; a quantum dot phosphor excited by the primary light provided from the light source to emit secondary light having a wavelength different from a wavelength of the primary light and disposed to be spaced apart from the light source; an optical agent absorbing light having a specific wavelength from the primary light provided by the light source and the secondary light emitted from the quantum dot phosphor; and a matrix configured to support the quantum dot phosphor and the optical agent. Further, the quantum dot phosphor and the optical agent are randomly mixed in the matrix; and the quantum dot phosphor, the optical agent, and the matrix form a composite.

18 Claims, 13 Drawing Sheets

(51) Int. Cl.
*G02F 1/1333* (2006.01)
*G02F 1/1335* (2006.01)

(52) U.S. Cl.
CPC .. *G02F 1/133617* (2013.01); *G02F 1/133308* (2013.01); *G02F 1/133603* (2013.01); *G02F 1/133609* (2013.01); *G02F 2001/133614* (2013.01); *G02F 2001/133624* (2013.01)

(56) References Cited

U.S. PATENT DOCUMENTS

| | | | | |
|---|---|---|---|---|
| 2008/0246902 | A1* | 10/2008 | Cheng | G02F 1/133617 349/69 |
| 2009/0147497 | A1* | 6/2009 | Nada | G02B 6/0023 362/84 |
| 2010/0201909 | A1* | 8/2010 | Jung | G02F 1/133528 349/61 |
| 2012/0113672 | A1* | 5/2012 | Dubrow | B82Y 20/00 362/602 |
| 2012/0127406 | A1* | 5/2012 | Geisow | G02F 1/13718 349/113 |
| 2012/0168787 | A1* | 7/2012 | Okumoto | H01L 27/3211 257/89 |
| 2012/0176812 | A1* | 7/2012 | Hwang | G02B 5/0221 362/606 |
| 2012/0223732 | A1* | 9/2012 | Kobayashi | G01R 35/005 324/756.03 |
| 2012/0287381 | A1* | 11/2012 | Li | G02F 1/133617 349/106 |
| 2013/0120678 | A1* | 5/2013 | Chao | G02F 1/01 349/34 |
| 2013/0120688 | A1* | 5/2013 | Chao | F21V 11/00 349/62 |
| 2013/0215645 | A1* | 8/2013 | Jang | G02B 6/0011 362/608 |
| 2014/0009959 | A1* | 1/2014 | Park | G02F 1/133615 362/559 |
| 2014/0056024 | A1 | 2/2014 | Kim et al. | |
| 2014/0119049 | A1 | 5/2014 | Kim et al. | |
| 2014/0125898 | A1 | 5/2014 | Chao et al. | |
| 2014/0168575 | A1* | 6/2014 | Wu | G02F 1/133514 349/65 |
| 2015/0299577 | A1* | 10/2015 | Junge | C09K 19/60 252/299.1 |
| 2016/0195774 | A1 | 7/2016 | Lee et al. | |

FOREIGN PATENT DOCUMENTS

| | | |
|---|---|---|
| KR | 10-2012-0107793 A | 10/2012 |
| KR | 10-2013-0095955 A | 8/2013 |
| KR | 10-2013-0120486 A | 11/2013 |
| KR | 10-2014-0026794 A | 3/2014 |
| KR | 10-2014-0056490 A | 5/2014 |

* cited by examiner

BACKLIGHT UNIT AND DISPLAY DEVICE COMPRISING SAME

BACKGROUND OF THE INVENTION

Field of the Invention

The present disclosure relates to a backlight unit (BLU) using a quantum dot phosphor, and particularly, to a backlight unit for realizing a wide color gamut and a display device having the same.

Description of the Related Art

A backlight unit serves to emit light to a rear side of a liquid crystal panel such that an image is seen to user's eyes. The liquid crystal panel is not self-luminous, and thus, the backlight unit is required to evenly emit light to the rear side of the liquid crystal panel so that a user may visually recognize an image output on a display device.

The backlight unit includes a light source, and as technologies have advanced, a light emitting diode (LED), as a light source, is currently used in a cold cathode fluorescent lamp (CCFL). An LED consumes less power, has a long lifespan, and easy to manufacture as a small device, and as such, the LED has various advantages over a CCFL.

In a backlight unit using an LED as a light source, there are various methods to form white light.

1) White light may be formed by combining light emitted from LEDs respectively emitting blue light, red light, and green light. This scheme, however, requires an excessive amount of LEDs and an additional feedback system to increase cost of a display device.

2) Another scheme of forming white light is combining an LED emitting blue light and a yellow (YAG) phosphor. Compared with the scheme of combining blue light, red light, and green light, in this scheme, the number of required LEDs is reduced to ⅓ and a feedback system is not required, reducing cost for manufacturing a display device. However, this scheme has a limitation in color reproduction (or a color gamut) is limited.

In order to overcome the limitation, recently, an approach to replace an existing yellow phosphor with a quantum dot (QD) has been reported. The quantum dot phosphor has different properties from those of general quantum dots. A quantum dot has properties of emitting light having various wavelengths according to types of materials and sizes of particles. For example, as a size of a particle of a quantum dot is smaller, the quantum dot emits light having a short wavelength, and as a size of a particle of a quantum dot is greater, the quantum dot emits light having a long wavelength. Thus, light having a desired wavelength may be emitted from an infrared ray to ultraviolet ray region by adjusting a size of a quantum dot.

A quantum dot phosphor is excited by primary light provided from a light source to emit secondary light having a wavelength different from that of the primary light. Here, the primary light refers to light emitted from a light source such as an LED. The secondary light refers to light excited from the primary light by a quantum dot phosphor.

A color gamut of a display device refers to capability of expressing a color of a display device. A color gamut of a display device is expressed as what percentage it is to ATSC (Advanced Television System Committee) of a color gamut of an existing LCD, or which percentage it is to a DPI (Dot per Inch), a new broadcasting standard. A major factor determining a color gamut is a wavelength of a three primary light emitted from a backlight unit and a full width at half maximum (FWHM) (a width in a position having a ½ value of a maximum value in a relative spectral power distribution.

As a backlight unit has a narrower FWHM, it may implement higher color gamut of a display device. For example, an FWHM of a backlight unit using an InP-based quantum dot phosphor is about 50 nm or less, and an FWHM of a backlight unit using a Cd-based quantum dot phosphor is about 30 nm or less. Since the FWHM of the backlight unit using the InP-based quantum dot phosphor is wider than that of the backlight unit using the Cd-based quantum dot phosphor, a color gamut of the former is inferior to that of the latter.

In every LED, it is easy to adjust a wavelength. However, it is known that a FWHM is difficult to reduce due to unique characteristics of a material and dispersion (or scattering) of processes. In particular, in the case of a backlight unit using a quantum dot phosphor, a factor for determining an FWHM results from a distribution of sizes of particles, a defect of a surface, and the like. Thus, in order to reduce the FWHM of the backlight unit using the quantum dot phosphor, processes are required to be improved but a degradation of yield is anticipated in the processes.

SUMMARY OF THE INVENTION

An aspect of the present disclosure provides a backlight unit capable of realizing a wide color gamut by reducing a FWHM of a peak in a light spectrum.

Another aspect of the present disclosure provides a backlight unit capable of restraining a reduction in a lifespan of a quantum dot phosphor, as well as realizing a wide color gamut.

According to an aspect of the present invention, a backlight unit includes: a light source formed to provide primary light; a quantum dot phosphor excited by the primary light provided from the light source to emit secondary light having a wavelength different from a wavelength of the primary light and disposed to be spaced apart from the light source; and an optical agent absorbing light having a specific wavelength from the primary light or the secondary light.

According to an embodiment related to the present disclosure, the optical agent may include at least one of a dye absorbing or reflecting light having a specific wavelength; a pigment absorbing or reflecting light having a specific wavelength; and a luminescent dye absorbing light having a specific wavelength and emitting light having a wavelength longer than that of the absorbed light.

The optical agent may include dyes or pigments coloring red, green, or purple.

The red coloring dye or pigment may reflect light with 620-650 nm, green coloring dye or pigment may reflect light with 520-550 nm, blue coloring dye or pigment may reflect light with 440-460 nm, and purple coloring dye or pigment may reflect light with 400-460 nm.

The dye or pigment may absorb light with 480-520 nm, 540-630 nm, or 650 nm or greater.

The optical agent may include luminescent dyes absorbing light with 480-520 nm, 540-630 nm, or 650 nm or greater, and emitting light with 620-650 nm, 520-550 nm, 440-460 nm, or 400-460 nm.

According to another example related to the present disclosure, the backlight unit may further include: a matrix configured to support the quantum dot phosphor and the optical agent, and the quantum dot phosphor, the optical agent, and the matrix may form a composite.

The light source may be disposed on one surface of a printed circuit board (PCB), and the composite may be provided in the form of a film, provided in a position spaced apart from the PCB, and disposed to face the light source.

The backlight unit may further include: a light guide plate guiding light provided from the light source, the light source may be disposed on the edge of the light guide plate, and the composite may be provided in the form of a tube and disposed between the light source and the light guide plate.

The backlight unit further may further include a light guide plate guiding light provided from the light source, the light source may be disposed on the edge of the light guide plate, and the composite may be provided in the form of a film and disposed to face one surface of the light guide plate.

According to another example related to the present disclosure, the backlight unit may further include: a first matrix configured to support the quantum dot phosphor; and a second matrix configured to support the optical agent, wherein the quantum dot phosphor and the first matrix may form a quantum dot phosphor film or a quantum dot phosphor tube, the optical agent and the second matrix may form an optical film, and the optical film may be stacked on the quantum dot phosphor film or the quantum dot phosphor tube.

The light source may be disposed on one surface of the PCB, the quantum dot phosphor film may be provided in a position spaced apart from the PCB and disposed to face the light source, and the optical film may be disposed on the opposite side of the light source with respect to the first matrix.

The backlight unit may further include a light guide plate guiding light provided from the light source, the light source may be disposed on the edge of the light guide plate, the quantum dot phosphor tube may be disposed to face one surface of the light guide plate, and the optical film may be disposed on the opposite side of the light guide plate with respect to the quantum dot phosphor tube.

The backlight unit may further include a light guide plate guiding light provided from the light source, the light source may be disposed on the edge of the light guide plate, the quantum dot phosphor film may be disposed to face one surface of the light guide plate, and the optical film may be disposed on the opposite side of the light guide plate with respect to the quantum dot phosphor film.

According to another example related to the present disclosure, the backlight unit may include: a bead configured to support the quantum dot phosphor and the optical agent; and a matrix configured to support the bead, wherein the bead includes the quantum dot phosphor and the optical agent and forms a composite together with the matrix.

The light source may be disposed on one surface of the PCB, the composite may be provided in the form of a film, provided in a position spaced apart from the PCB, and disposed to face the light source.

The backlight unit may further include: a light guide plate guiding light provided from the light source, the light source may be disposed on the edge of the light guide plate, and the composite may be provided in the form of a tube and disposed between the light source and the light guide plate.

The backlight unit may further include: a light guide plate guiding light provided from the light source, the light source may be disposed on the edge of the light guide plate, and the composite may be provided in the form of a film and disposed to face one surface of the light guide plate.

Also, in order to realize the above subject, the present disclosure discloses a display device including a backlight unit.

The display device may include: a liquid crystal panel; and a backlight unit emitting light to a rear side of the liquid crystal panel, wherein the backlight unit may include: a light source providing primary light; a quantum dot phosphor exciting the primary light provided from the light source to emit secondary light having a wavelength different from a wavelength of the primary light, and disposed to be spaced apart from the light source; and an optical agent absorbing light having a specific wavelength from the primary light or the secondary light.

Advantageous Effects

According to the present disclosure having the aforementioned configuration, an FWHM of primary light or secondary light may be reduced using 1) dye, pigment or luminescent dye dispersed in a matrix including a quantum dot phosphor, 2) dye, pigment or luminescent dye stacked on a matrix including a quantum dot phosphor, or 3) dye, pigment or luminescent dye dispersed in a bead.

Also, in the present disclosure, a wide color gamut may be achieved by reducing an FWHM of an optical spectrum without an additional process. In the present disclosure, in order to achieve the wide color gamut, a general color filter, rather than a thick color filter, may be used in a display device.

Also, in the present disclosure, since a quantum dot phosphor has a remote phosphor structure spaced apart from a light source, a reduction in a life span of a quantum dot phosphor due to heat transmitted from the light source may be restrained.

DETAILED DESCRIPTION OF THE EMBODIMENTS

Hereinafter, a quantum dot composite and a backlight unit having the same related to the present disclosure will be described in detail with reference to the accompanying drawings, in which like numbers refer to like elements throughout although the embodiments are different. As used herein, the singular forms "a", "an" and "the" are intended to include the plural forms as well, unless the context clearly indicates otherwise. In the following description, usage of suffixes such as 'module', 'part' or 'unit' used for referring to elements is given merely to facilitate explanation of the present invention, without having any significant meaning by itself.

Hereinafter, in order to clarify the present disclosure, a backlight unit and a display device will be first described and a quantum dot and a quantum dot phosphor applied to a backlight unit will then be described. Thereafter, a backlight unit employing a quantum dot phosphor will be described, and a backlight unit employing an optical agent proposed in the present disclosure will then be described.

Figure 1:
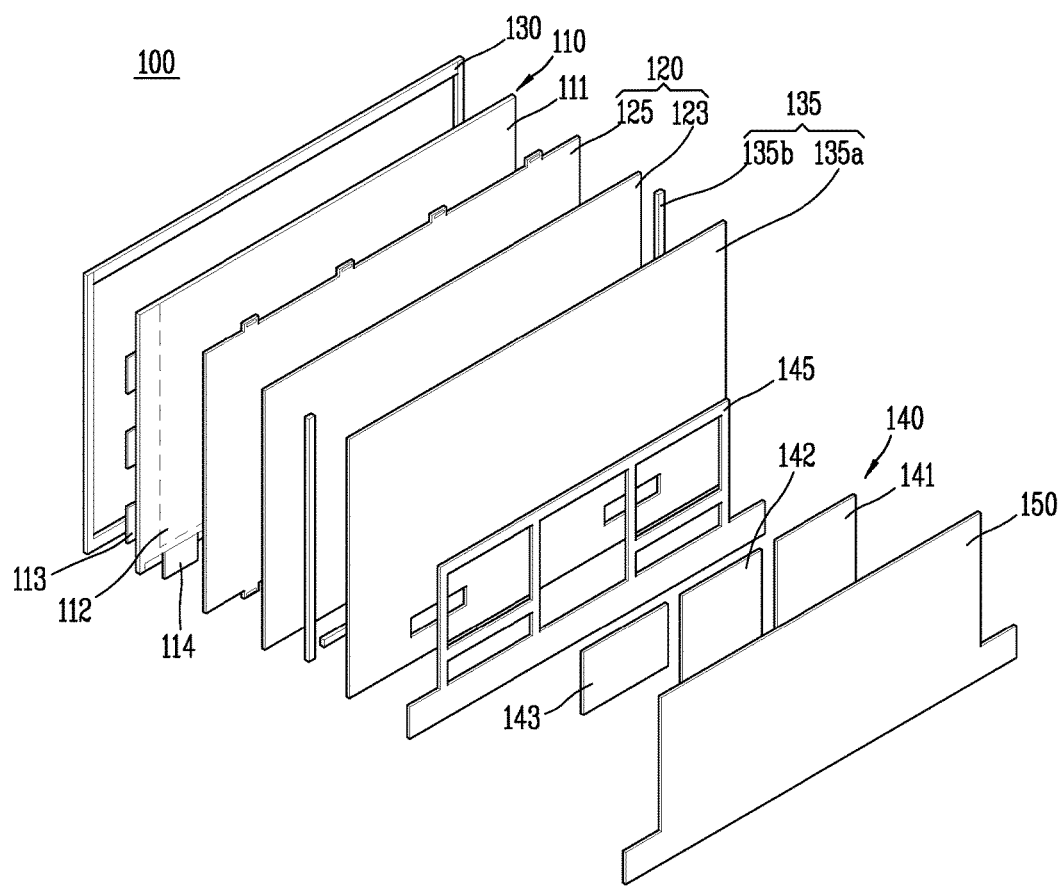
FIG. 1 is a conceptual view of a display device related to the present disclosure.

FIG. 1 is a conceptual view of a display device 100 related to the present disclosure.

The display device 100 of FIG. 1 is a display device applied to a television, for example. However, the display device 100 is not limitedly applied to a television but may also be applied to a mobile terminal such as a smartphone or a tablet, or a monitor.

Referring to FIG. 1, the display device 100 may include a liquid crystal panel 110, a backlight unit 120, a cover 130, a housing 135, a driving unit 140, and a rear case 150.

The liquid crystal panel 110 is part where an image is implemented and may include a first substrate 111 and a second substrate 112 attached in a facing manner with a liquid crystal layer interposed therebetween. Although not shown, a plurality of scan line and a plurality of data lines may intersect with each other in a matrix form to define a plurality of pixels on the first substrate 111 called a TFT array substrate. A thin film transistor (TFT) turning on and off a signal may be provided in each of the pixels. A pixel electrode connected to each TFT may be provided in each pixel.

Red (R), green (G), and blue (B) color filters corresponding to a plurality of pixels may be provided in the second substrate 112 called a color filter substrate. A black matrix covering a non-display element such as a scan line, a data line, a TFT, and the like, may be provided to surround each of color filters. Also, a transparent common electrode covering the color filters and the black matrix may be provided in the second substrate 112.

Also, a PCB is connected to at least one side of the liquid crystal panel 110 by the medium of a connection member such as a flexible circuit board or a tape carrier package (TCP), and the PCB may be tightly attached to a rear surface of the housing 135 during a modularization process.

In the liquid crystal panel 110 having the aforementioned structure, when a TFT selected by each scan line by an ON/OFF signal of a gate driving circuit 13 transferred from a scan line is turned on, a data voltage of the data driving circuit 114 is transferred to a corresponding pixel electrode through a data line. Accordingly, an arrangement direction of liquid crystal molecules is changed by an electric field between a pixel electrode and a common electrode to make a difference in transmissivity.

Meanwhile, the display device 100 of the present disclosure may include a backlight unit 120 providing light to the liquid crystal panel 110 from a rear side of the liquid crystal panel 110.

The backlight unit 120 may include an optical assembly 123 and a plurality of optical sheets 125 disposed on the optical assembly 123. In the present disclosure, at least one of the plurality optical sheets 125 may be a film including a quantum dot composite. Details of the backlight unit 120 will be described hereinafter.

The aforementioned liquid crystal panel 110 and the backlight unit 120 may be modularized through the cover 130 and the housing 135. The cover 130 positioned on a front side of the liquid crystal panel 110 may be a top cover. The cover 130 may have a rectangular frame shape covering an upper surface and a side surface of the liquid crystal panel 110. A front side of the cover 130 may be opened to expose an image displayed on the liquid crystal panel 110.

Also, a housing 135 positioned on a rear side of the backlight unit 120 may include a bottom plate 135a and a supporting plate 135b. The bottom plate 135a may be a bottom cover. The bottom plate 135a, coupled to the liquid crystal panel 110 and the backlight unit 120 to support the display device 100, may have a rectangular plate shape. The supporting plate 135b is formed to be coupled to the cover 130 and the bottom plate 135a, and supports the backlight unit 120.

A driving unit 140 may be disposed on one surface of the housing 135. The driving unit 140 may include a driving controller 141, a main board 142, and a power supply unit 143. The driving controller 141 may be a timing controller and adjusts operation timing of each driving circuit of the liquid crystal panel 110. The main board 142 transfers a vertical synchronization signal, a horizontal synchronization signal, and an RGB resolution signal to the timing controller. The power supply unit 143 applies power to the liquid crystal panel 110 and the backlight unit 120.

The driving unit 140 may be provided on one surface of the housing 130 positioned on a rear surface of the backlight unit 120 by means of a driving unit chassis 145. Also, the driving unit 140 may be covered by the rear case 150.

The aforementioned backlight unit will be described in detail.

Figure 2:
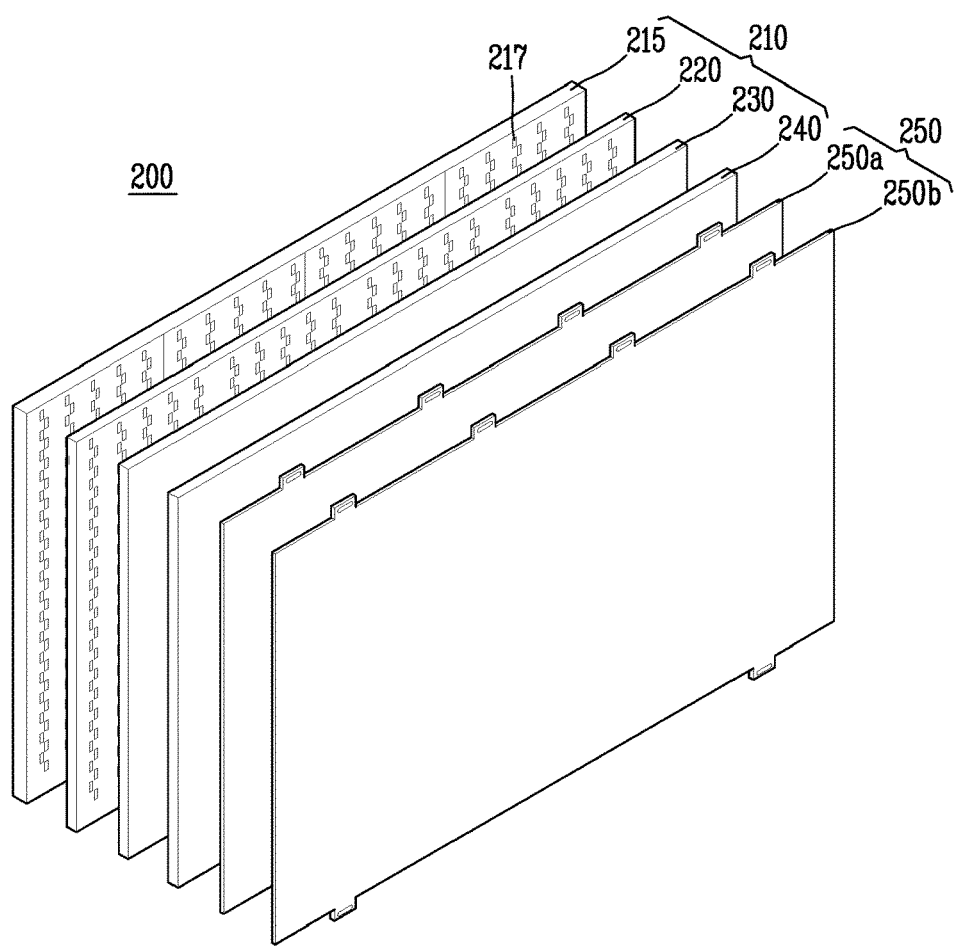
FIG. 2 is an exploded perspective view of a backlight unit related to the present disclosure.
Figure 3:
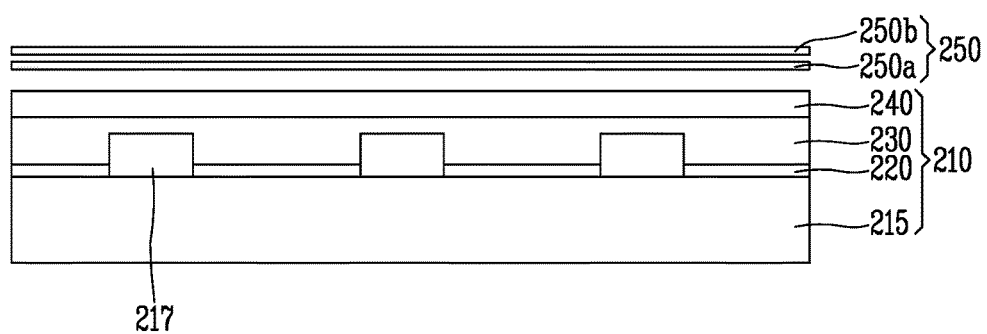
FIG. 3 is a side cross-sectional view of a backlight unit related to the present disclosure.

FIG. 2 is an exploded perspective view of a backlight unit 200 related to the present disclosure. FIG. 3 is a side cross-sectional view of the backlight unit 200 related to the present disclosure.

Referring to FIGS. 2 and 3, the backlight unit 200 may include an optical assembly 210 and an optical sheet 250.

The optical assembly 210 may include a first layer 215, a plurality of light sources 217, a reflective layer 220, a second layer 230, and a diffusion plate 240.

The plurality of light sources 217 are disposed on the first layer 215. The second layer 230 is disposed on the first layer 215 and covers the plurality of light sources 217.

The first layer 215 may be a substrate, and the plurality of light sources 217 may be mounted on the substrate. Also, an electrode pattern (not shown) connecting an adapter (not shown) and a light source 217 may be provided on the substrate. For example, a carbon nano-tube (CNT) electrode pattern (not shown) connecting the light sources 217 and an adapter (not shown) may be provided on an upper surface of the substrate.

The first layer 215 may be a printed circuit board (PCB), and the PCB may be formed of polyethyleneterephthalate (PET), glass, polycarbonate (PC), or silicon. The first layer 215 may be formed as a film.

The light source 217 may be one of a light emitting diode (LED) chip or an LED package including at least one LED chip. In this embodiment, an example in which the light source 217 is an LED package will be described, but the light source 217 of the present disclosure is not limited thereto.

The LED package forming the light source 217 may be classified into a top view type and a side view type depending on a direction in which an emission surface faces, and the light source 217 according to an embodiment of the present disclosure may be configured using at least one of the top view type LED package in which an emission surface is formed toward an upper side and the side view type LED package in which an emission surface is formed toward a side surface.

A case in which the light source 217 is the side view type LED package will be described. The plurality of light sources 217, whose emission surfaces are disposed on a side surface, emit light in a direction in which the first layer 215 or the reflective layer 220 extends.

With this structure, a thickness of the second layer 220 may be reduced to make the backlight unit 200 slimmer, and further, make a display device slimmer.

Also, the light source 217 may be configured as a colored LED or a white LED emitting at least one of red, blue, and green colors or a white LED. Also, the colored LED may include at least one of a red LED, a blue LED, and a green LED, and a disposition of such an LED and emission light may be variously modified and applied.

The second layer 230 may be disposed on the first layer 215 and covers the plurality of light sources 217. The second layer 230 may transmit and simultaneously spread light emitted from the light sources 217 to allow light emitted from the light source 217 to be evenly provided to the liquid crystal panel.

The reflective layer 220 reflecting light emitted from the light sources 217 may be positioned on the first layer 215. The reflective layer 220 may be formed in a region excluding regions in which the light sources 217 are formed, on the first layer 215. The reflective layer 220 may reflect light emitted from the light sources 217 and reflect light totally reflected from the boundary of the second layer 230 such that light is widely spread.

The reflective layer 220 may include at least one of a metal or a metal oxide, a reflective material. The reflective layer 220 may include a metal or a metal oxide having high reflectivity such as aluminum (Al), silver (Ag), gold (Au), or titanium dioxide ($TiO_2$), for example.

In this case, the reflective layer 220 may be formed by depositing or coating the metal or the metal oxide on the first layer 215 and may be formed by printing metal ink. Here, as the deposition method, a vacuum deposition method such as a thermal deposition method, an evaporation method, or a sputtering method may be used. As the coating or printing method, a printing method, a gravure method, or a silk screen method may be used.

Meanwhile, the second layer 230 positioned on the first layer 215 may be formed of a light-transmissive material, for example, a silicon or acrylic resin. However, the second layer 230 is not limited thereto and may be formed of various resins.

Also, in order to allow the backlight unit to have uniform brightness through spreading of light emitted from the light sources 217, the second layer 230 may be formed of a resin having reflectivity ranging from about 1.4 to 1.6. For example, the second layer 230 may be formed of any one material selected from the group consisting of polyethyleneterephthalate (PET), polycarbonate (PC), polypropylene (PP), polyethylene (PE), polystyrene (PS), polyepoxy (PE), silicon, acryl, and the like.

Also, the second layer 230 may include a polymer resin having adhesion so as to be firmly tightly attached to the light sources 217 and the reflective layer 220. For example, the second layer 230 may include acryl-based, urethane-based, epoxy-based, or melamine-based resin, such as unsaturated polyester, methylmethacrylate, ethymethacrylate, isobutylmethacrylate, n-butyl methylmethacrylate, an acrylic acid, a methacrylic acid, hydroxyethylmethacrylate, hydroxyl propyl methacrylate, hydroxyl ethyl acrylate, acryl amide, methylol acryl amide, glycidyl methacrylate, ethyl acrylate, isobutyl acrylate, n-butyl acryalte, and 2-ethyl hexyl acrylate polymer, copolymer, terpolymer, and the like.

The second layer 230 may be formed by applying a liquid or gel resin to the first layer 215 on which the plurality of light sources 217 and the reflective layer 220 are formed, and curing the resin, or applying a resin to a support sheet, partially curing the resin, and bonding the same to the first layer 215.

The diffusion plate 240 may be provided on the second layer 230 to spread light emitted from the light sources 217 upwardly. The diffusion plate 240 may be adhered to the second layer 230, and here, the diffusion plate 240 may be bonded using an additional adhesive member. Also, the optical sheets 250 may be positioned on the aforementioned optical assembly 210, and at least one of the optical sheets 250 may be a film including a quantum dot composite.

Figure 4:
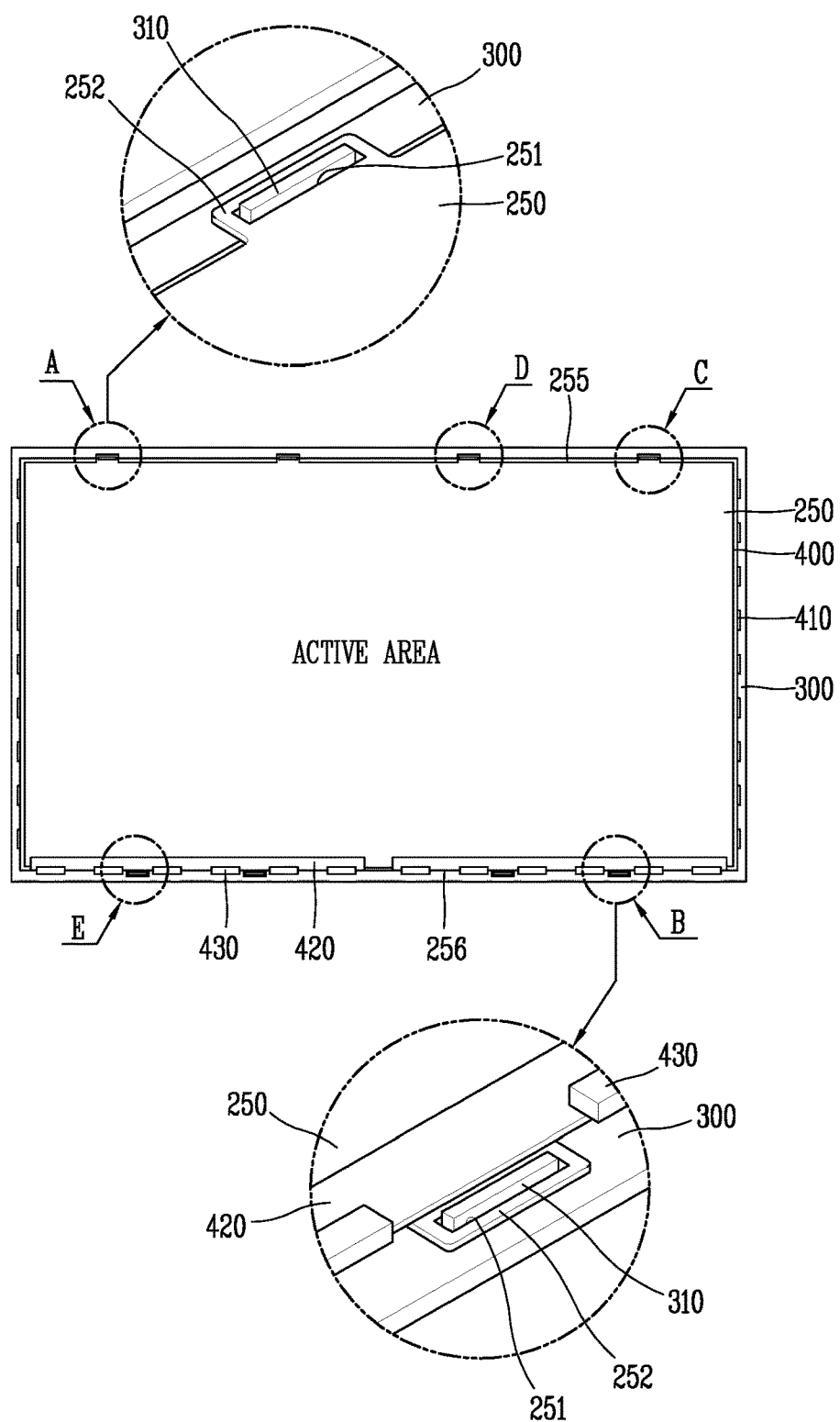
FIG. 4 is a conceptual view illustrating a liquid crystal panel and an optical sheet coupled to a housing.

FIG. 4 is a conceptual view illustrating a liquid crystal panel 400 and an optical sheet 250 coupled to a housing.

Referring to FIG. 4, a liquid crystal panel 400 may be positioned on a cover 300, and the optical sheet 250 may be positioned on the liquid crystal panel 400. A plurality of gate driving circuits 410 may be disposed on left and right sides of the liquid crystal panel 400, and a PCB 420 may be disposed below the liquid crystal panel 400 and surrounding an upper side of the optical sheet 250 from the liquid crystal panel 400. A plurality of data driving circuits 430 may be disposed on the PCB 420.

Here, the optical sheet 250 disposed on the cover 300 may be coupled to a fixed portion 310 of a cover 300. The fixed portion 310 may be inserted into a hole 251 of the optical sheet 250.

In detail, referring to a region A of FIG. 4, the fixed portion 310 may be inserted into the hole 251 formed in a protrusion portion 252. That is, the fixed portion 310 may be inserted into and coupled to the hole 251 of the optical sheet 250.

Also, referring to a region B of FIG. 4, the fixed portion 310 may be inserted into the hole 251 formed in the protrusion portion 252 formed in a lower side wall of the cover 300. Here, the protrusion portion 252 of the optical sheet 250 and the fixed portion 310 may be disposed between data driving circuits 430 of the liquid crystal panel 400.

That is, in order to secure a region in which the data driving circuit 430 is mounted on a side surface of the cover 300, the fixed portion 310 may be disposed between the data driving circuits 430, and the protrusion portion 252 and the hole 251 of the optical sheet 250 may also be disposed between the data driving circuits 430 according to a disposition of the fixed portion 310.

Hereinafter, an edge type display device will be described.

Figure 5:
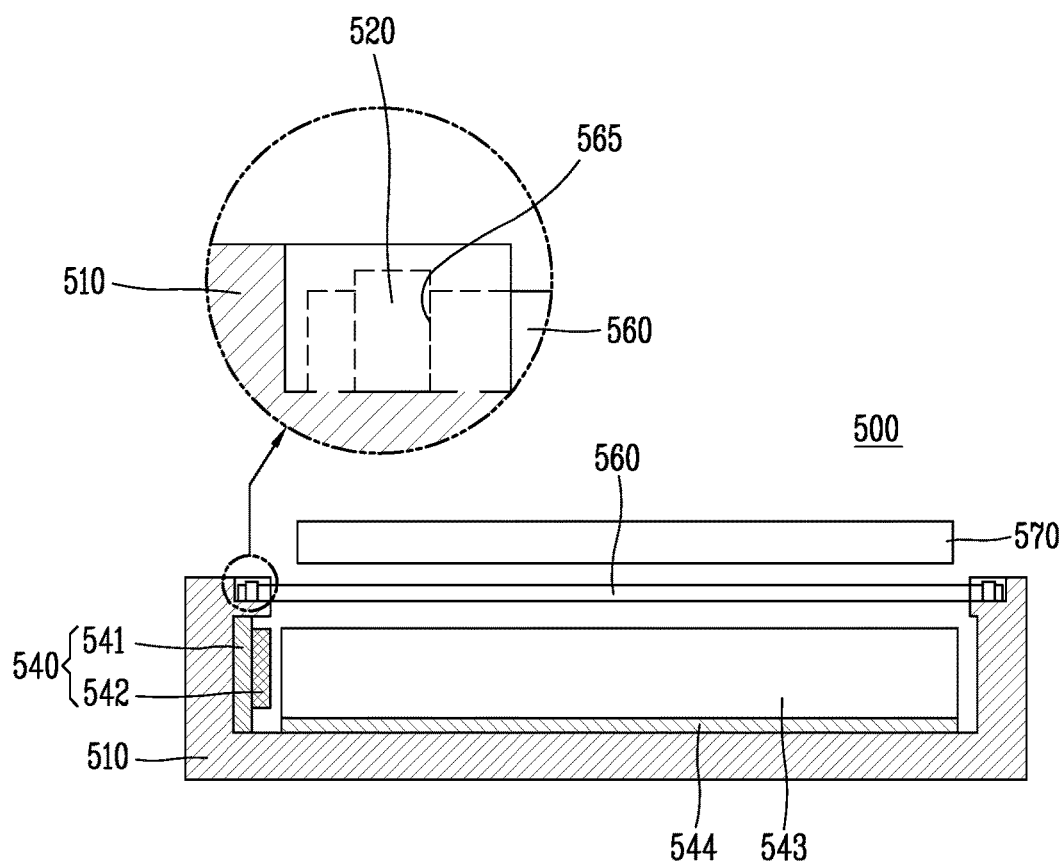
FIG. 5 is a conceptual view illustrating an edge type display device.

FIG. 5 is a conceptual view illustrating an edge type display device.

Referring to FIG. 5, a display device 500 may include a bottom plate 510, an optical assembly 540, an optical sheet 560, and a liquid crystal panel 570.

The bottom plate 510 may be a bottom plate of a housing and receive the optical assembly 540 and the optical sheet 560.

The optical assembly 540 received in the bottom plate 510 may include a first layer 541 and a light source 542. The first layer 541 may be a substrate on which a plurality of light sources 542, and an electrode pattern (not shown) connecting an adapter (not shown) for supplying power and the light sources 542 may be formed thereon.

The first layer 541 may be a PCB formed of PET, glass, PC, or silicon, allowing the plurality of light sources 542 to be mounted thereon, and may be formed as a film.

The light source 542 may be one of an LED chip or an LED package including at least one LED chip. In this embodiment, an example in which the light source 542 is an LED package will be described.

The LED package forming the light source 542 may be classified into a top view type and a side view type depending on a direction in which an emission surface faces, and the light source 542 according to an embodiment of the present disclosure may be configured using at least one of the top view type LED package in which an emission surface is formed toward an upper side and the side view type LED package in which an emission surface is formed toward a side surface.

A light guide plate 543 may be disposed in a direction in which light from the light source 542 is emitted, and serve to widely spread light incident from the light source 542. also, the reflective plate 544 may be disposed below the light guide plate 543 to upwardly reflect light reflected from a lower side of the light guide plate 543.

As described above, the optical assembly 540 including the first layer 541 and the light source 542 may be positioned on the side surface of the bottom plate 510 to act as a backlight unit implementing light in an edge type. This method is distinguished from the direct type described above with reference to FIG. 3.

Meanwhile, the optical sheet 560 may be positioned on the light guide plate 543. The optical sheet 560 may be a diffusion sheet spreading light or a prism sheet collecting light. The optical sheet 560 may be configured in plurality.

The optical sheet 560 may be mounted on the light guide plate 543, and may be coupled to a fixed portion 520 formed on a side wall of the bottom plate 510. Here, the optical sheet 560 may include a plurality of holes 565. Also, the bottom plate 510 may include a plurality of fixed portion 520.

Thus, the optical sheet 560 may be fixed to the bottom plate 510 as the holes 565 of the optical sheet 560 are coupled to the fixed portion 520 formed on the side wall of the bottom plate 510.

Thus, the optical sheet 560 is prevented from contracting or expanding so as to be deformed by heat generated by the light sources 542 of the optical assembly 540. Thus, light uniformity of the backlight unit may be enhanced.

Hereinafter, a mobile terminal having a display module will be described. The mobile terminal is an example of a display device outputting visual information. The display module serves to output visual information from the mobile terminal.

A mobile terminal described in this disclosure may include a mobile phone, a smartphone, a laptop computer, a digital broadcasting terminal, a personal digital assistant (PDA), a portable multimedia player (PMP), a navigation device, a slate PC, a table PC, an ultrabook, a wearable device (e.g., a watch type terminal (smart watch), glass type terminal (smart glass), a head mounted display (HIVID), and the like.

Figure 6:
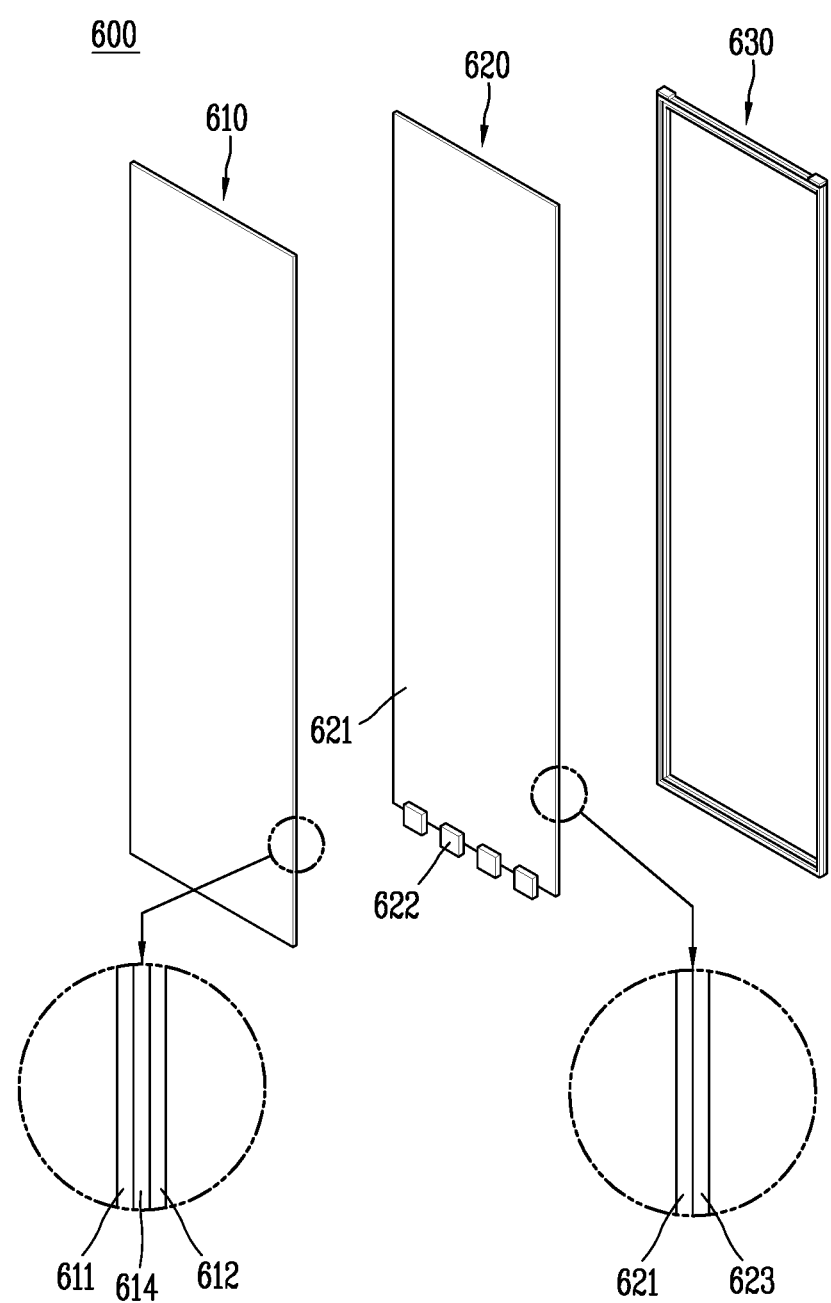
FIG. 6 is an exploded perspective view illustrating a display module of a mobile terminal related to the present disclosure.

FIG. 6 is an exploded perspective view illustrating a display module 600 of a mobile terminal related to the present disclosure.

Referring to FIG. 6, as an exploded perspective view of the display module 600, illustrates a liquid crystal panel 610, a backlight unit 620, and a mold 630.

The liquid crystal panel 610 applies a signal to a transistor to induce a phase change of liquid crystal to output a desired color by pixels. The liquid crystal panel 610 includes two transparent substrates 611 and 612 and a liquid crystal layer 614 positioned therebetween. A transparent upper electrode is formed on the upper substrate 611 and a transparent lower electrode is formed on the lower substrate 612.

The upper substrate 611 includes a color filter for displaying a color, and as such, the upper substrate 611 is termed a color filter layer. An array of liquid crystal is changed by controlling a voltage of the upper electrode and the lower electrode, thereby allowing light supplied from the backlight unit 620 to be selectively transmitted.

The backlight unit 620 is positioned below the liquid crystal panel 610 to uniformly supply light toward the liquid crystal panel 610. The backlight unit 620 includes a light guide plate 621 and a light source 622 supplying light to the light guide plate 621.

The light guide plate 621 is formed of a transparent material, a transparent acryl panel may be an example. In order to evenly supply light supplied from the light source 622 to a front side of the liquid crystal panel 610, various patterns may be formed on a surface of the light guide plate 621 and a prism film or a reflective film 623 may be attached to a surface thereof.

The light source 622 supplies light to the light guide plate 621. In FIG. 6, an LED type light source 622 is illustrated as an example, but various types of light source 622 may be used. Also, a position of the light source 622 is not limited to the side surface of the light guide plate 621 as illustrated in FIG. 6 but may be formed in various positions.

The mold 630 is coupled to the circumferences of the liquid crystal panel 610 and the backlight unit 620 to cover side surfaces of the backlight unit 620.

Figure 7:
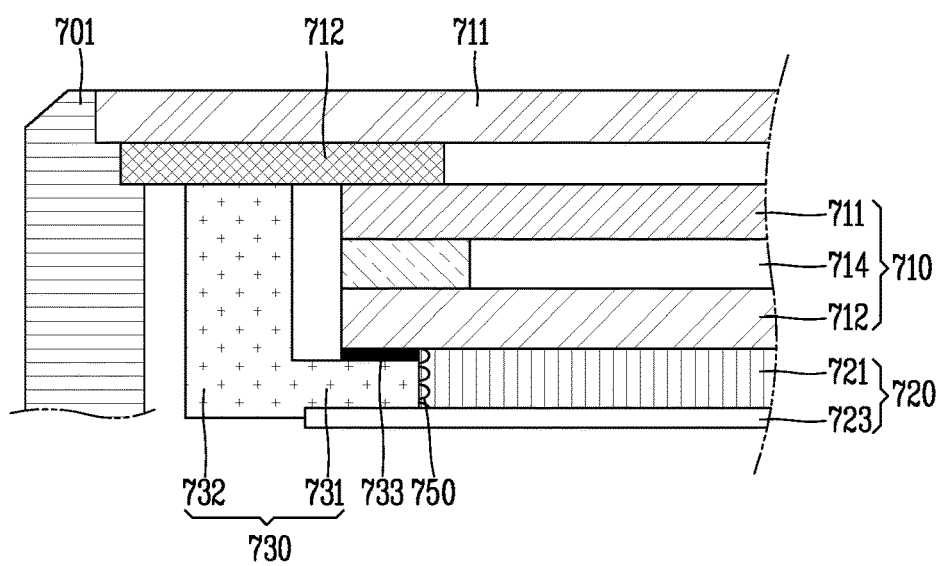
FIG. 7 is a side cross-sectional view illustrating a display module of a mobile terminal related to the present disclosure.

FIG. 7 is a side cross-sectional view illustrating a display module 700 of a mobile terminal related to the present disclosure.

A display module 700 is disposed in a region defined by a front case 701. A backlight unit 720 is disposed in a region defined by the mold 730.

The mold 730 includes a panel support part 731 and a side wall part 732 extending from the panel support part 731 in a forward direction of the display module 700 to cover a side surface of the liquid crystal panel 710. Alternatively, the mold 730 may include only the panel support part 731 whose upper surface is coupled to a circumference of a lower surface of the liquid crystal panel 710.

The panel support part 731 of the mold 730 surrounds the backlight unit 720.

An upper surface of the mold 730 is in contact with a circumference of the lower surface of the liquid crystal panel 710 to fix the backlight unit 720 and the liquid crystal panel 710.

Also, the upper surface of the panel support part 731 and the liquid crystal panel 710 may be coupled using an adhesive 733 of a bonding pad in a dark color to prevent light leakage to the coupling part of the mold 730.

As mentioned above, the mold 730 may further include the side wall part 732 extending from the panel support part 731, and the side wall part 732 covers a side surface of the liquid crystal panel 710. The side wall part 732 serves to protect side surfaces of the liquid crystal panel 710 and the backlight unit 720 and support a force pressed by the front glass 711.

Since the mold 730 covers the side surface of the backlight unit 720, light may be emitted through the side surface of the panel support part 731 from the side surface of the backlight unit 720. In a case in which the mold 730 in a bright color is used, light may be reflected from the side wall part 732 of the mold 730 and incident to the side surface of the liquid crystal panel 710. Here, due to light incident in an abnormal path other than a normal path in which light is incident from a rear surface of the liquid crystal panel 710, light leakage may occur. In order to prevent light leakage, it is required to prevent light from being incident to the mold 730 or cover light, which has been incident to the mold 730, not to be incident to the liquid crystal panel 710.

Unlike the illustrated case, the mold 730 may include the panel support part 731 without the side wall part 732. In this case, light incident to the mold 730 is not incident to the side surface of the liquid crystal panel 710. With this structure, since the structure in which light leakage is problematic is removed, light incident to the side surface may be blocked.

However, since the side wall part covering the side surface of the liquid crystal panel 710 is not present, it is difficult to distribute a force applied to the liquid crystal panel 710, leading to a possibility of damaging the liquid crystal panel 710 due to external impact. In order to prevent this, a protrusion (not shown) may be provided on a side surface of the case 701. When the case protrusion is positioned between an upper surface of the mold 730 and the front glass 711, a protection function of the liquid crystal panel 710, which was performed by the side wall part 732 of the mold 730, may be performed by the case protrusion. There is a boundary between the case protrusion and the mold 730 to primarily block a path of light incident to the mold 730. The case protrusion is integrally formed with the case 701 and thus, it does not have a surface reflecting light toward the liquid crystal panel 710. Thus, the case protrusion may prevent light from being incident to the side surface of the liquid crystal panel 710.

Hereinafter, a quantum dot phosphor related to the present disclosure will be described, and a quantum dot composite using the quantum dot phosphor will be described.

Figure 8:
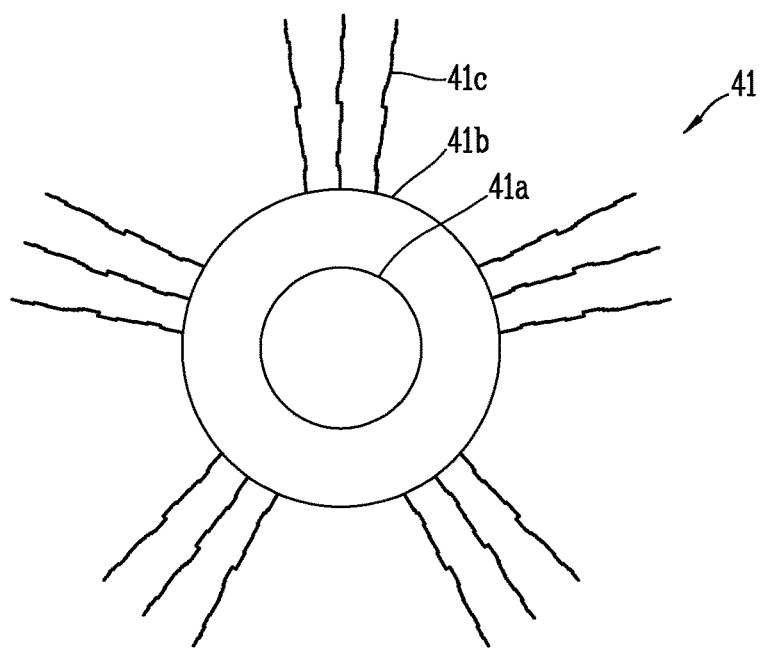
FIG. 8 is a conceptual view of a quantum dot related to the present disclosure.

FIG. 8 is a conceptual view of a quantum dot 41 related to the present disclosure.

The quantum dot 41 includes a nano-scale core 41a formed of an inorganic material and an organic ligand 41c stabilizing the core 41a. Various quantum dots 41 such as Group II-VI, Group III-V, Group IV-VI, Group I-III-V, and the like, have been reported. For example, any one selected from the group consisting of CdS, CdSe, CdTe, ZnS, ZnSe, ZnTe, HgS, HgSe, HgTe, GaN, GaP, GaAs, GaSb, AlN, AlP, AlAs, AlSb, InN, InP, InAs, InSb, Si, Ge, and a mixture thereof may be used.

In general, the core 41a has a large surface area and a volume ratio, and thus, it is unstable. Also, various traps restraining optical coupling are present on the unstable surface of the core 41a. The unstable surface and traps of the core 41a affect light generation and increase non-phosphoric energy emission, absolutely lowering quantum efficiency. Thus, in order to prevent a degradation of quantum efficiency, the core 41a is covered with a cell 41b formed of an inorganic material to stabilize the quantum dot 41.

A quantum dot phosphor refers to the quantum dot described above with reference to FIG. 8 used as a phosphor. The quantum dot phosphor is excited by primary light provided from a light source and emits secondary light having a wavelength different from that of the primary light. For example, the quantum dot phosphor may be excited by blue primary light provided from the light source to emit green or red secondary light.

Here, the primary light and the secondary light may be classified into light before and after being absorbed to the quantum dot phosphor. Light exciting the quantum dot phosphor, like light provided from the light source, is classified as primary light. Light emitted from the quantum dot phosphor is classified as secondary light.

Phosphor of the quantum dot 41 is light generated as electrons in an excited state comes down to a valance band from a conduction band. The quantum dot phosphor has a full width at half maximum (FWHM) (a width of a position having a ½ value of a maximum value in a relative spectral power distribution) narrower than that of an existing phosphor, and thus, it is advantages for a wide color gamut.

In a case in which blue primary light is used as a light source, the quantum dot phosphor may be excited by the blue primary light to emit green or red secondary light, and thus, white light may be formed by combining the primary light and the secondary light.

Hereinafter, a quantum dot phosphor film using a quantum dot as a phosphor, and a quantum dot phosphor tube using a quantum dot phosphor will be described.

Figure 9:
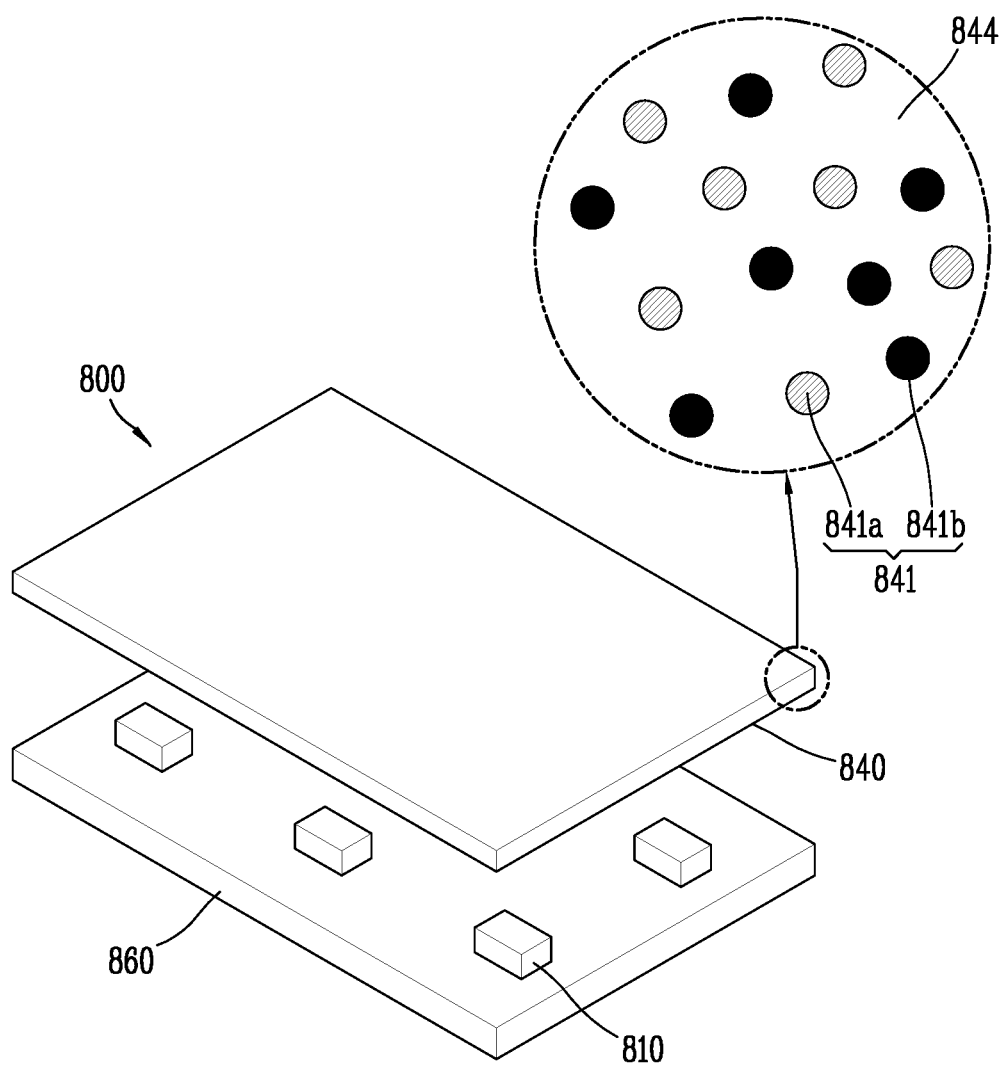
FIG. 9 is a conceptual view of a quantum dot phosphor film and a backlight unit having the same.

FIG. 9 is a conceptual view of a quantum dot phosphor film 840 and a backlight unit 800 having the same.

The backlight unit 800 of FIG. 3 is a direct type backlight unit. However, the backlight unit 800 of the present disclosure is not limited to the direct type.

The backlight unit 800 includes a light source and a quantum dot phosphor film 840.

The light source is formed to provide primary light. As discussed above, the light source may include an LED 810 emitting light upon receiving a current. The LED 810 may be disposed on one surface of a printed circuit board (PCB) 860. Although not shown in FIG. 3, a reflective plate may be formed on one surface of the PCB 860 and the LED 810 may be disposed on the reflective plate. The reflective plate reflects light, which does not travels toward the quantum dot phosphor film 840 but is lost, to the quantum dot phosphor film 840. The LED 810 illustrated in FIG. 9 is configured to emit blue primary light.

The quantum dot phosphor film 840 is a component including a quantum dot phosphor 841. The quantum dot phosphor film 840 is configured to emit three primary light using the primary light provided from the LED 810. The quantum dot phosphor 841 is excited by the primary light provided from the LED 810 to emit secondary light having a wavelength different from that of the primary light.

A configuration of the quantum dot phosphor 841 may be varied according to the light source and an inorganic phosphor. In a case in which the LED 810 emits blue primary light as illustrated in FIG. 9, the quantum dot composite 840 includes a green light emission quantum dot phosphor 841a and a red light emission quantum dot phosphor 841b. The green light emission quantum dot phosphor 841a is excited by the blue primary light provided from the LED 810 to emit green secondary light. The red light emission quantum dot phosphor 841b is excited by the blue primary light provided from the LED 810 to emit red secondary light. Accordingly, the backlight unit 800 may emit three primary light including the blue primary light, the green secondary light, and the red secondary light.

Unlike the case of FIG. 9, the light source may include an LED emitting blue primary light and a green light emission inorganic phosphor or red light emission inorganic phosphor may be included in the backlight unit.

In a case in which the backlight unit includes an LED emitting blue primary light and a green light emission inorganic phosphor, the quantum dot phosphor film includes a red light emission quantum dot phosphor. The red light emission quantum dot phosphor is excited by the blue primary light provided from the LED and green primary light provided from the green light emission inorganic phosphor to emit red secondary light. Blue light is provided from the LED, green light is provided from the green light emission inorganic phosphor, and red light is provided from the red light emission quantum dot phosphor. Thus, the backlight unit may emit three primary light even without a green light emission quantum dot phosphor.

In a case in which the backlight unit includes the LED emitting blue primary light and a red light emission inorganic phosphor, the quantum dot phosphor film includes a green light emission quantum dot phosphor. The green light emission quantum dot phosphor is excited by blue primary light to emit green secondary light. Blue light is provided from the LED, green light is provided from the green light emission quantum dot phosphor, and red light is provided from the red light emission inorganic phosphor. Thus, the backlight unit may emit three primary light even without a red light emission quantum dot phosphor.

In the present disclosure, the quantum dot phosphors 841a and 841b are disposed to be spaced apart from the LED 810 to restrain a reduction in a lifespan due to heat from the LED 810. The quantum dot phosphor film 840 is disposed to be spaced apart from the LED 810 to form a remote phosphor structure. The remote phosphor structure refers to a structure in which a light source and a phosphor are separated from each other and spaced apart from each other. In the direct type backlight unit 800, the quantum dot phosphor film 840 may be disposed to face the LED 810 and may be provided with a blue primary light directly from the LED 810.

Figure 10:
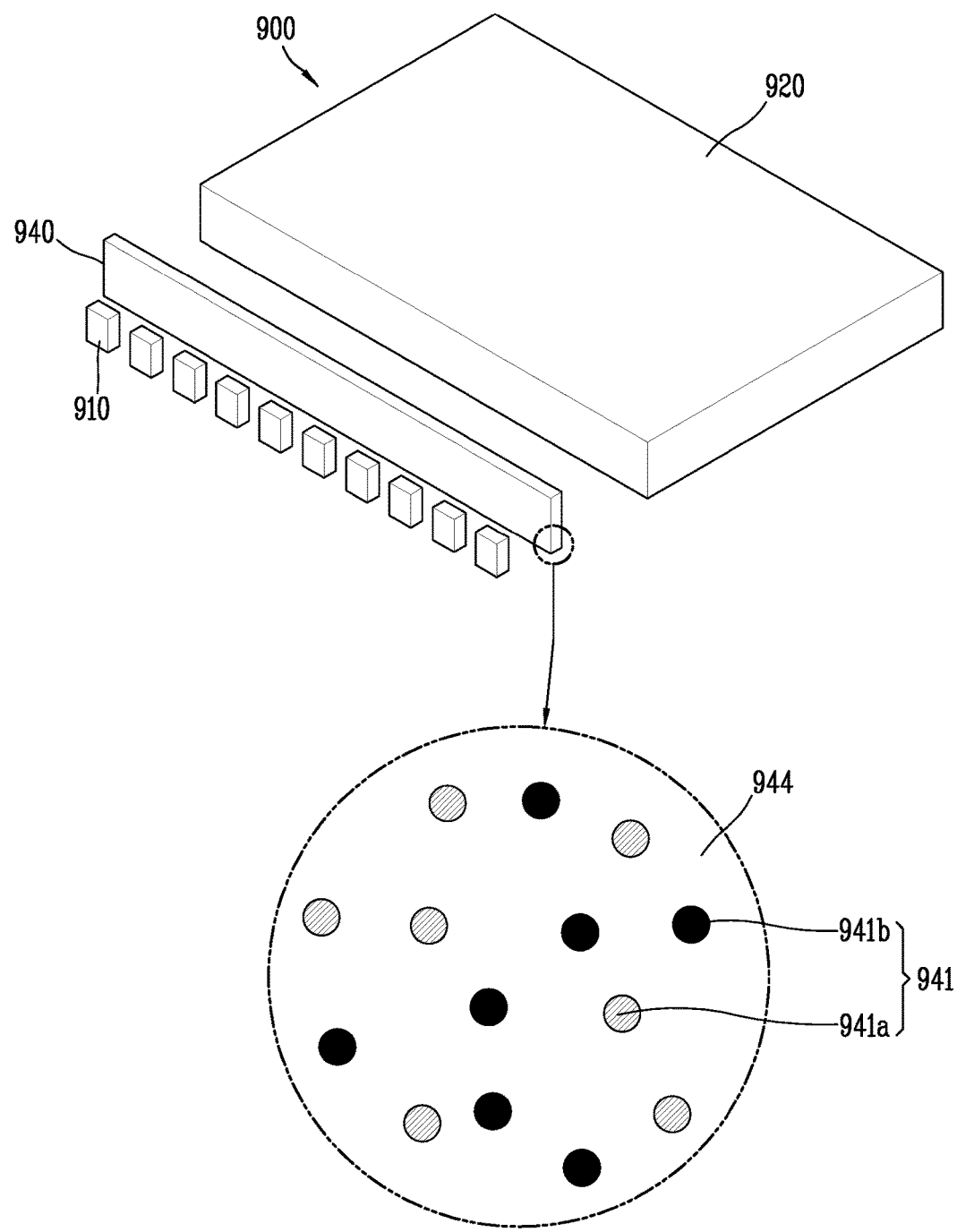
FIG. 10 is a conceptual view of a quantum dot phosphor tube and a backlight unit having the same.

FIG. 10 is a conceptual view of a quantum dot phosphor tube 940 and a backlight unit 900 having the same.

In FIG. 10, an edge backlight unit 900 in which a light source is disposed on an edge of a light guide plate 920 is illustrated as an example. However, the backlight unit 900 is not limited to the edge type.

The backlight unit 900 includes a light source, a quantum dot phosphor tube 940, and a light guide plate 920.

The light source is configured to provide primary light. The light source may include an LED 910 emitting blue primary light.

Quantum dot phosphors 941a and 941b are disposed to be spaced apart from the LED 910 to restrain a reduction in a lifespan due to heat from the LED 301. The structure of the backlight unit 900 illustrated in FIG. 10 is different from that of the backlight unit 800 illustrated in FIG. 3, but it is the same in that the quantum dot phosphor 941 is spaced apart from the LED 910. The quantum dot phosphor tube 940 is disposed to be spaced apart from the LED 910 to form the remote phosphor structure. The quantum dot phosphor tube 940 is disposed to face the LED 910 and directly receives primary light from the LED 940.

The quantum dot phosphor tube 940 is disposed between the LED 910 and the light guide plate 920. The light guide plate 920 is disposed on the opposite side of the LED 910 with respect to the quantum dot phosphor tube 940. Three primary light emitted from the quantum dot phosphor tube 940 is guided by the light guide plate 920 so as to be oriented toward the liquid crystal panel 110 describe above.

The quantum dot phosphor tube 940 is configured to emit three primary light using primary light provided from the LED 910. The quantum dot phosphor tube 940 includes a quantum dot phosphor 941. The quantum dot phosphor 941 is excited by the primary light provided from the LED 910 to emit secondary light having a wavelength different from that of the primary light. A type of the quantum dot phosphor 941 may be varied according to a type of a light source and an inorganic phosphor as mentioned above with reference to FIG. 9.

The LED 910 may emit blue primary light. The quantum dot phosphor tube 940 includes a green light emission quantum dot phosphor 941a and a red light emission quantum dot phosphor 941b. The green light emission quantum dot phosphor 941a is excited by primary light to emit green secondary light. The red light emission quantum dot phosphor 941b is excited by primary light to emit red secondary light. The backlight unit 900 emits three primary light including blue primary light, green secondary light, and red secondary light.

Hereinafter, a configuration of the present disclosure realizing a wide color gamut by reducing an FWHM of an optical spectrum will be described.

Figure 11:
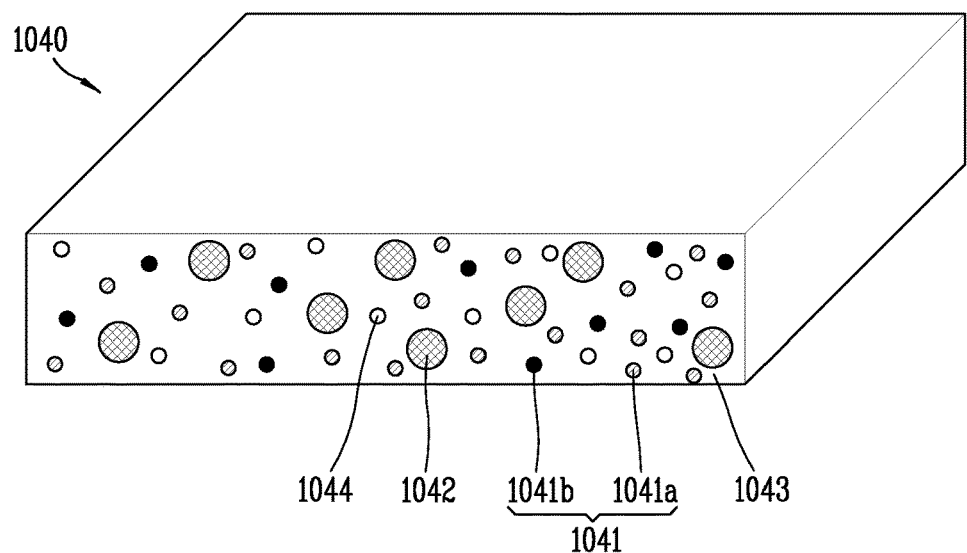
FIG. 11 is a conceptual view of a composite including a quantum dot phosphor and an optical agent.

FIG. 11 is a conceptual view of a composite 1040 including a quantum dot phosphor 1041 and an optical agent 1041.

The composite 1040 may include a quantum dot phosphor 1041, a dispersing agent 1042, a matrix 1043, and an optical agent 1044.

As described above, the quantum dot phosphor 1041 may be excited by primary light provided from a light source to emit secondary light having a wavelength different from that of the primary light. The quantum dot phosphor 1041 illustrated in FIG. 11 is illustrated to include a green light emission quantum dot phosphor 1041a and a red light emission quantum dot phosphor 1041b. Thus, it is supposed that the light source may include only an LED (not shown) emitting blue primary light.

Efficiency of the composite 1040 is directly connected to cost, performance, and a size of a product. Use of the quantum dot composite 1040 with high efficiency may reduce cost of a product and realizes a thinner backlight unit. The quantum dot composite 1040 with high efficiency refers to a composite capable of emitting three primary light sufficiently with only a small number of quantum dot phosphors 1041.

Thus, in order to emit three primary light only with a relatively small number of quantum dot phosphors 1041, primary light is required to be sufficiently scattered. In order to scatter primary light, a dispersing agent 1042 is used. The dispersing agent 1042 scatters primary light to increase an amount of light converted from primary light to secondary light by the quantum dot phosphor 1041.

The dispersing agent 1042 enhances efficiency of the composite 1040 through scattering of primary light. Also, the dispersing agent 1042 prevents secondary light emitted from the quantum dot phosphor 1041 from being re-absorbed to other quantum dot phosphor 1041 and enhances extraction efficiency of secondary light. Thus, the dispersing agent 1042 may enhance efficiency of the quantum dot composite 1040.

The matrix 1043 is configured to support the quantum dot phosphor 1041 and the dispersing agent 1042. The matrix 1043 may be formed by curing a resin. The quantum dot phosphor 1041 and the dispersing agent 1042 are dispersed inside the matrix 1043. The composite 1040 may be formed in the form of a film or a tube by the matrix 1043.

A color gamut of the display device is varied according to a wavelength of three primary light provided from the backlight unit and an FWHM of an optical spectrum. As the FWHM is narrower, a wide color gamut of the display device may be realized.

Unlike a wavelength of the LED, the FWHM is known to be difficult to reduce due to unique characteristics of a material and a dispersion of processes. In particular, in the case of the backlight unit using a quantum dot phosphor, a factor for determining an FWHM results from a distribution of sizes of particles, a defect of a surface, and the like.

In the present disclosure, in order to overcome the limitation of the related art, an optical agent 1044 is used. The optical agent 1044 absorbs light of a specific wavelength from primary light or secondary light to reduce an FWHM of a peak in an optical spectrum.

Referring to FIG. 11, the matrix 1043 is configured to support the quantum dot phosphor 1041, the dispersing agent 1042, and the optical agent 1044. The quantum dot phosphor 1041, the dispersing agent 1042, and the optical agent 1044 are dispersed in the matrix 1043. The quantum dot phosphor 1041, the dispersing agent 1042, the optical agent 1044, and the matrix 1043 constitute the composite 1040.

The composite 1040 may be formed as a film or a tube.

When the composite 1040 is formed as a film, the backlight unit may have such a structure as that described above with reference to FIG. 9. For example, an LED may be disposed on one surface of the PCB and the composite 1040 may be disposed to face the LED in a position spaced apart from the PCB.

Figure 18:
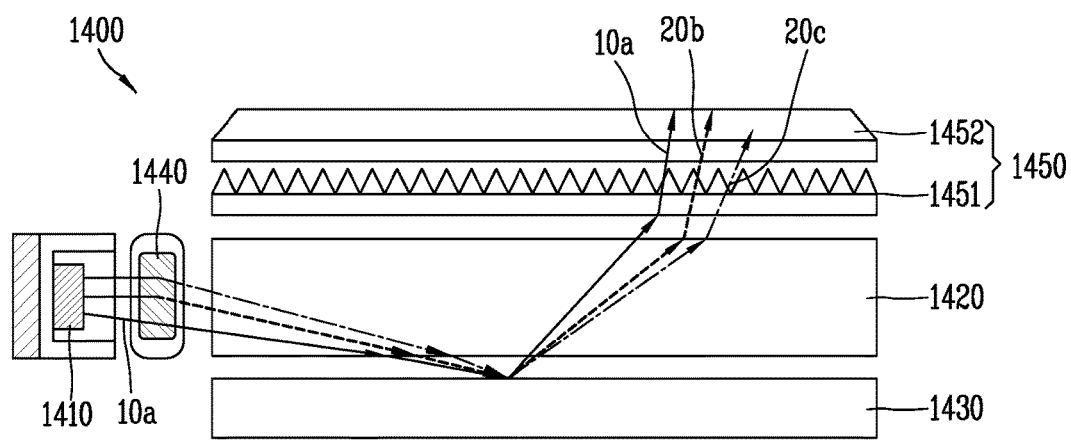
FIG. 18 is a conceptual view illustrating a process in which light travels when a tube type composite is applied to a backlight unit.

When the composite 1040 is formed as a tube, the backlight unit may be formed to have such a structure as that described above with reference to FIG. 10 or a structure illustrated in FIG. 18 to be described. For example, an LED may be disposed on an edge of a light guide plate, and the composite 1040 may be disposed between the LED and the light guide plate. In addition to this structure, a structure in which the composite 1040 is formed as a film and disposed to face one surface of the light guide plate may also be provided.

The optical agent 1044 may include at least one of dye, pigment, and luminescent dye. Dye, pigment, and luminescent dye all act as the optical agent 1044 reducing a FWHM of a peak of an optical spectrum in the present disclosure. Hereinafter, each of the dye, pigment, and luminescent dye will be described.

Dye absorbs light of a specific wavelength. Pigment also absorbs light of a specific wavelength. Dye and pigment are materials that change the color of reflected or transmitted light as the result of wavelength-selective absorption. Dye and pigment are common in that they are a colorant. However, dye is generally used in a state of being dissolved in a solvent, whereas pigment is used in a state of particles dispersed in a solvent. However, in the present disclosure, both dye and pigment may be used as the optical agent 1044 and are not used for completely different purposes.

Dye includes at least some of red coloring dye, green coloring dye, blue coloring dye, and purple coloring dye, for example. Like dye, pigment may include at least some of red coloring pigment, green coloring pigment, blue coloring pigment, and purple coloring pigment, for example.

The red coloring dye or the red coloring pigment reflects light with 620-650 nm. This means that a main reflection peak of the red coloring dye or the red coloring pigment in the optical spectrum is formed with 620-650 nm.

The green coloring dye or the green coloring pigment reflects light with 520-550 nm. This means that a main reflection peak of the green coloring dye or the green coloring pigment in the optical spectrum is formed with 520-550 nm. The green coloring dye absorbs a portion of blue light having a short wavelength and a portion of red light having a long wavelength.

The blue coloring dye or the blue coloring pigment reflects light with 440-460 nm. This means that a main reflection peak of the blue coloring dye or the blue coloring pigment in the optical spectrum is formed with 440-460 nm. The blue coloring dye largely absorbs orange light.

The purple coloring dye or the purple coloring pigment reflects light with 400-460 nm. This means that a main reflection peak of the purple coloring dye or the purple coloring pigment in the optical spectrum is formed with 400-460 nm.

Dye or pigment absorbs light with 480-520 nm, 540-630 nm, or 650 nm or higher. This means that an absorption peak of dye or pigment in the optical spectrum is formed with 480-520 nm, 540-630 nm, or 650 nm.

In addition to dye and pigment, luminescent dye may also be used as an optical agent 1044 of the present disclosure.

Luminescent dye absorbs light of a specific wavelength and emits light of a longer wavelength than that of the absorbed light. Luminescent dye absorbs light with 480-520 nm, 540-630 nm, or 650 nm or higher and emits light with 620-650 nm, 520-550 nm, 440-460 nm, or 400-460 nm. This means that an absorption peak of luminescent dye in the optical spectrum is formed with 480-520 nm, 540-630 nm, or 650 nm, and an emission peak is formed with 620-650 nm, 520-550 nm, 440-460 nm, or 400-460 nm.

The dyes and pigments having the reflectivity wavelength and the absorption wavelength described above and the luminescent dyes having the absorption wavelength and the emission wavelength described above all correspond to the optical agent 1044 capable of reducing a FWHM of the peak in the optical spectrum. The range of the reflectivity wavelength and the range of the absorption wavelength are important factors related to a reduction in an FWHM of the peak in the optical spectrum.

Hereinafter, examples of dye, pigment, and luminescent dye with respect to an optical spectrum will be described with reference to FIGS. 12 to 14.

Figure 12:
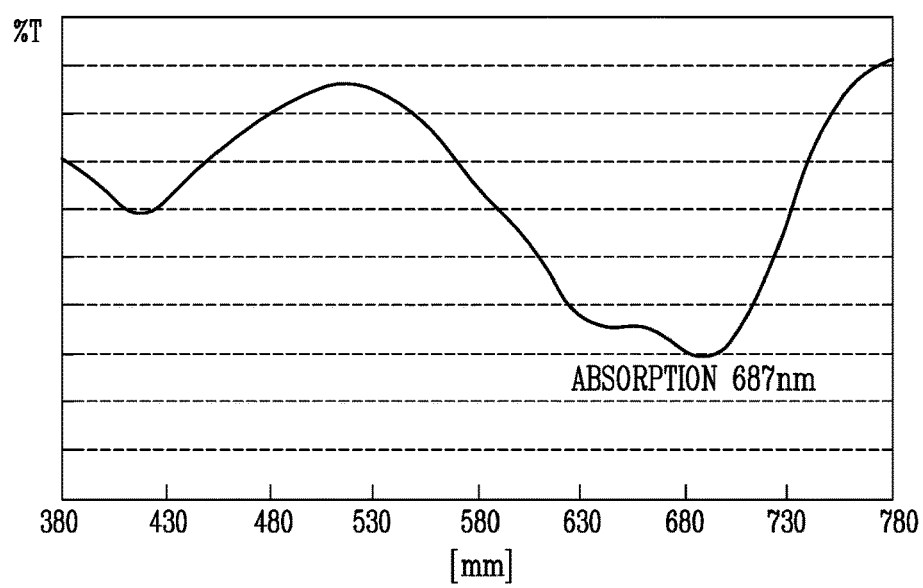
FIG. 12 is a view of a light spectrum illustrating transmissivity of each wavelength of light regarding green coloring dye.

FIG. 12 is an optical spectrum illustrating transmissivity of each wavelength of light regarding green coloring dye.

The horizontal axis of the optical spectrum represents a wavelength (nm) of light, and the vertical axis represents transmissivity (%). When transmissivity of light is low in a range of a specific wavelength, it means that an absorption rate of light is high in the range of the wavelength.

Referring to FIG. 12, it can be seen that an absorption peak of light in the optical spectrum of the green coloring dye is formed within a range of about 687 nm. It can be seen that, through the absorption peak of light, green coloring dye absorbs light having a wavelength of about 687 nm. Also, it can be seen that, since the absorption peak of the green coloring dye is higher than 650 nm, the green coloring dye may be used as an optical agent of the present disclosure.

Figure 13:
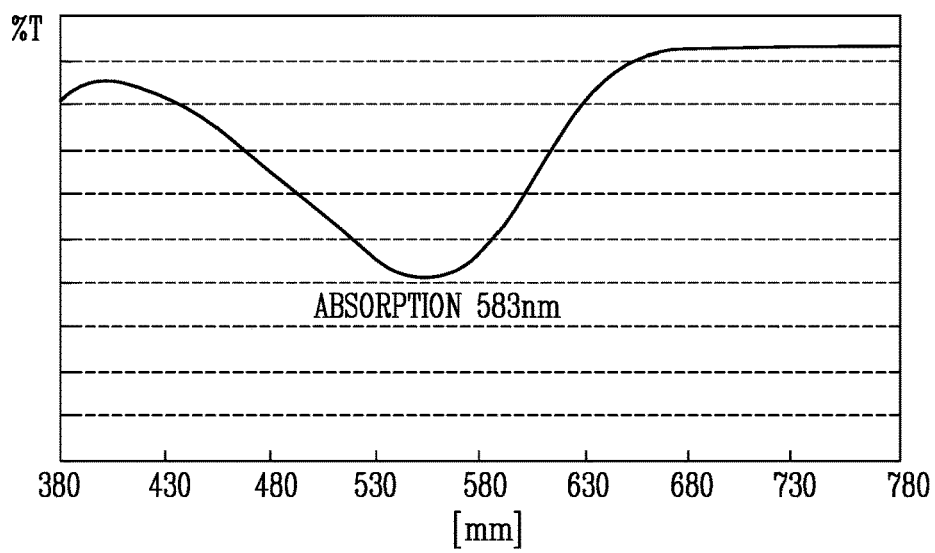
FIG. 13 is a view of a light spectrum illustrating transmissivity of each wavelength of light regarding purple pigment.

FIG. 13 is a view of a light spectrum illustrating transmissivity of each wavelength of light regarding purple pigment.

The horizontal axis, the vertical axis, and the peak of the optical spectrum are the same as those described above with reference to FIG. 6. Referring to FIG. 7, it can be seen that the absorption peak of light in the optical spectrum of the purple coloring pigment is formed within a range of about 583 nm. It can be seen that, through an absorption peak of light, the purple coloring pigment absorbs light having a wavelength of about 583 nm. Also, it can be seen that, since the absorption peak of the purple coloring pigment is within a range of 540-630 nm, the purple coloring pigment may be used as an optical agent of the present disclosure.

Figure 14:
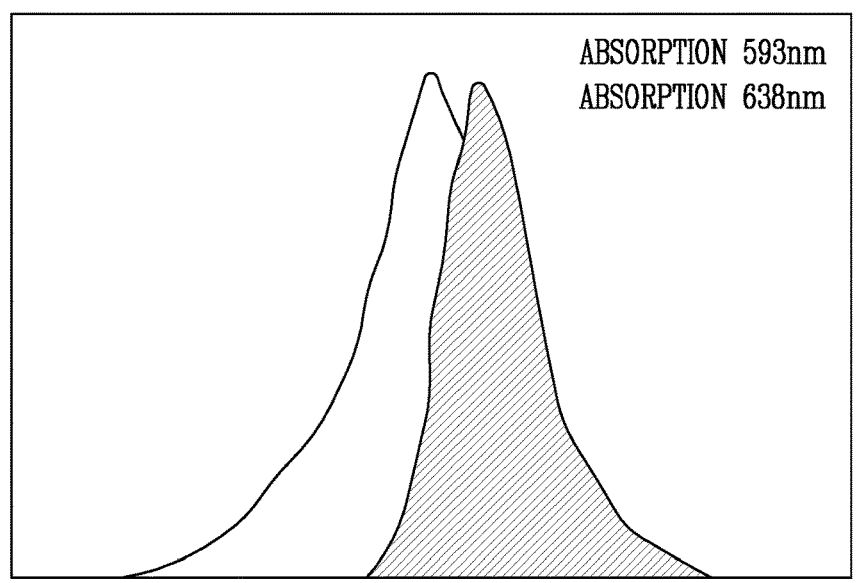
FIG. 14 is a view of a light spectrum illustrating transmissivity of each wavelength of light regarding red coloring luminescent dye.

FIG. 14 is a view of a light spectrum illustrating transmissivity of each wavelength of light regarding red coloring luminescent dye.

In the optical spectrum, the horizontal axis represents a wavelength (nm) of light and the vertical axis is an arbitrary unit representing relative intensity of light.

Referring to FIG. 14, it can be seen that an absorption peak of light in the optical spectrum of the red coloring luminescent dye is formed within a range of about 593 nm and an emission peak is formed within a range of about 638 nm. It can be seen that, through the absorption peak and the emission peak, the red coloring luminescent dye emits light having a wavelength of about 593 nm and emits light having a wavelength of about 638 nm Also, it can be seen that, since the absorption peak of the red coloring luminescent dye is within a range of 540-630 nm and the emission peak is within a range of 620-650 nm, the red coloring luminescent dye may be used as an optical agent of the present disclosure.

Hereinafter, another embodiment of a backlight unit including an optical agent will be described.

Figure 15:
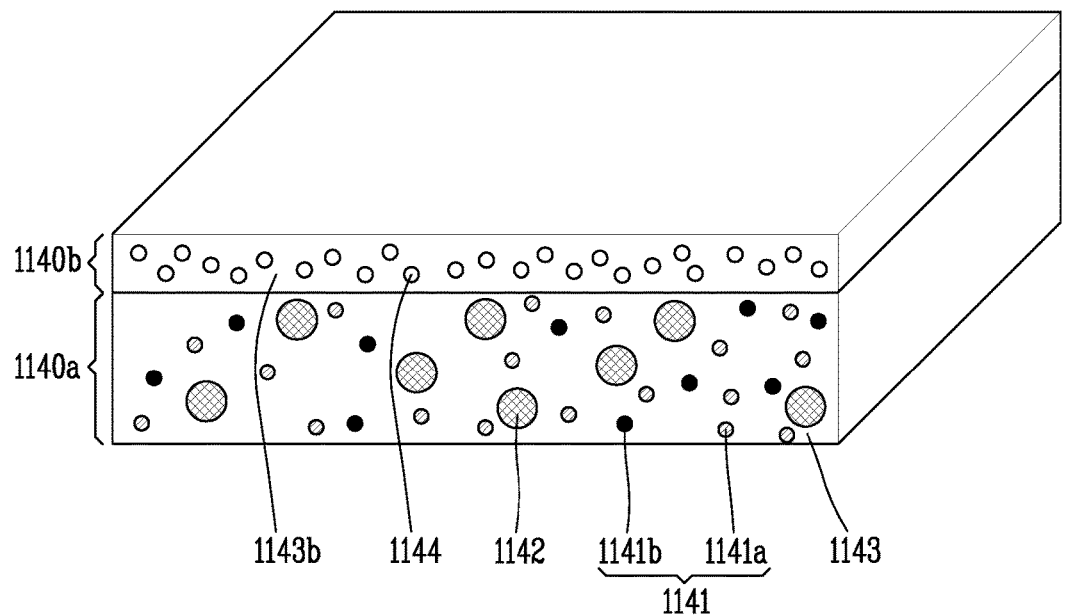
FIG. 15 is a conceptual view of a quantum dot phosphor film and an optical film.

FIG. 15 is a conceptual view of a quantum dot phosphor film 1140a and an optical film 1140b.

Unlike the composite 1040 described above with reference to FIG. 14, the optical agent 1144 of FIG. 15 is disposed on a layer different from that of a quantum dot phosphor 1141.

The quantum dot phosphor film 1140a includes a phosphor 1141, a dispersing agent 1142, and a first matrix 1143a.

The first matrix 1143a is configured to support the quantum dot phosphor 1141 and the dispersing agent 1142. The quantum dot phosphor 1141 and the dispersing agent 1142 are disposed in the first matrix 1143a. The quantum dot phosphor 1141, the dispersing agent 1142, and the first matrix 1143a constitute the quantum dot phosphor film 1140a. In addition to the quantum dot phosphor film 1140a, the quantum dot phosphor 1141, the dispersing agent 1142, and the first matrix 1143a may constitute the quantum dot phosphor 1140a. Structures of a film and a tube will be referred to FIGS. 9 and 10.

The optical film 1140b includes a second matrix 1143b and an optical agent 1144.

The second matrix 1143b is configured to support the optical agent 1144. The optical agent 1144 is dispersed in the second matrix 1143b. The optical agent 1144 and the second matrix 1143b form the optical film 1140b. The optical film 1140b is stacked on the quantum dot phosphor film 1140a or the quantum dot phosphor tube (not shown).

Figure 17:
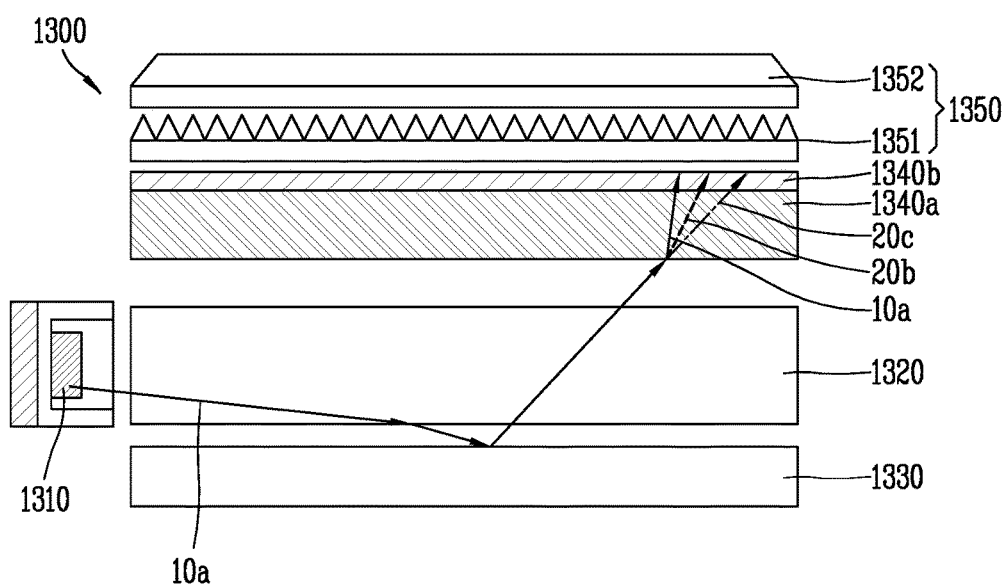
FIG. 17 is a conceptual view illustrating a process in which light travels when a quantum dot phosphor film and an optical film are applied to a backlight unit.

A structure of a backlight unit including the quantum dot phosphor film 1140a and the optical film 1140b may be referred to the above descriptions with reference to FIG. 9 and FIG. 17 to be described. A structure of a backlight unit including a quantum dot phosphor tube and an optical film may be referred to the descriptions with reference to FIG. 10 and FIG. 18 to be described.

Figure 16:
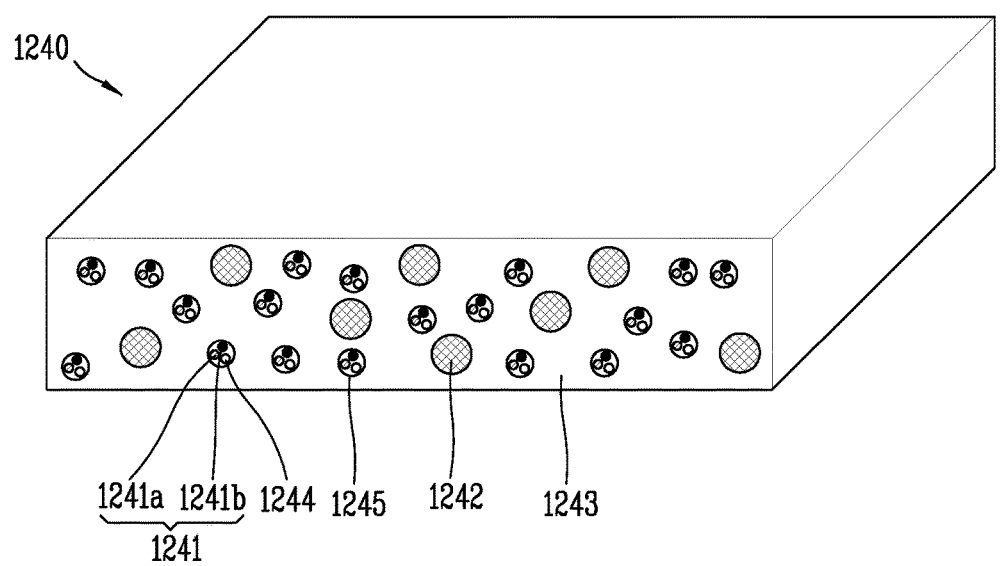
FIG. 16 is a conceptual view of a composite including an optical agent and a quantum dot phosphor dispersed in beads.

FIG. 16 is a conceptual view of a composite 1240 including an optical agent 1244 and a quantum dot phosphor 1241 dispersed in beads 1245.

The composite 650 includes the quantum dot phosphor 1241, a dispersing agent 1142, a matrix 1243, and an optical agent 1244. Descriptions of other components are the same as those of FIG. 14, and thus, the redundant descriptions will be omitted, and here, only a difference to FIG. 14 will be described.

The composite 1240 further includes beads 1245 configured to support the quantum dot phosphor 1241 and the optical agent 1244. The beads 1245 may be considered as another matrix differentiated from the matrix 1243. The quantum dot phosphor 1241 and the optical agent 1244 are dispersed in the beads 1245. The beads 1245 including the quantum dot phosphor 1241 and the optical agent 1244 are disposed in the matrix 1243 again. The beads 1245 are dispersed in the matrix 1243 to form a composite with the matrix 1243.

The composite 1240 may be formed as a film or a tube. The composite 1240 formed as a film may be referred to the descriptions with reference to FIG. 9 and FIG. 17 as described hereinafter. Also, the composite 1240 formed as a tube may be referred to the descriptions with reference to FIG. 10 and FIG. 18 as described hereinafter.

FIG. 17 is a conceptual view illustrating a process in which light travels when a quantum dot phosphor film 1340a and an optical film 1340b are applied to a backlight unit 1300.

In FIG. 17 the arrows indicate a travel path of light. In order to differentiate, reference numerals are given to the arrows of FIG. 11 according to the following regulations.

(1) 1 is given to a place for ten in primary light, like light provided from a light source or emitted from an inorganic phosphor. 2 is given to a place for ten in secondary light emitted from a quantum dot phosphor. For example, blue primary light provided form the light source is given a reference numeral 10a.

(2) a is given to blue light, b is given to green light, and c is given to red light. For example, green secondary light is given a reference numeral 20b.

In FIG. 17, the quantum dot phosphor film 1340a and the optical film 1340b are illustrated as separate components, and thus, it can be seen that the configuration illustrated in FIG. 17 corresponds to the configuration described above with reference to FIG. 12.

The quantum dot phosphor film 1340a is disposed to be spaced apart from an LED 1310 to form a remote phosphor structure. Since the quantum dot phosphor film 1340a is formed to be spaced apart from the LED 1310, a reduction in a lifespan of a quantum dot phosphor (not shown) due to heat from the LED 1310 may be restrained. As illustrated in FIG. 17, the quantum dot phosphor film 1340a may be disposed between a light guide plate 1320 and an optical sheet 1350.

The LED 1310 emits blue primary light 10a. The light guide plate 1320 guides the primary light 10a. A reflective plate 1330 reflects the primary light 10a, and the reflected primary light 10a is incident to the quantum dot phosphor film 1340a through the light guide plate 1320.

The quantum dot phosphor film 1340a emits three primary light using the primary light 10a. The quantum dot phosphor film 1340a of the present disclosure includes the quantum dot phosphor (please refer to 1141a and 1141b of FIG. 15, and hereinafter, reference numeral will be omitted). A green light emission quantum dot phosphor is excited by the blue primary light 10a to emit green secondary light 20b. The red light emission quantum dot phosphor 1141b is excited by the blue primary light 10a to emit red secondary light 20c. The quantum dot phosphor film 1340a emits the blue primary light 10a, green secondary light 20b, and red secondary light 20c. The backlight unit 1300 may emit white light by combining the blue primary light 10a, the green secondary light 20b and the red secondary light 20c.

The optical film 1340b includes an optical agent (not shown), and the optical agent absorbs light having a specific wavelength from primary light or secondary light to reduce a FWHM of a peak in an optical spectrum. The optical film 1340b is stacked on the quantum dot phosphor film 1340a. With respect to the quantum dot phosphor film 1340a, the optical film 1340b is disposed on the opposite side of the light guide plate 1320.

An FWHM of the peak in the optical spectrum may be reduced by the optical film 1340b. In the present disclosure, the FWHM of the peak is reduced using the optical agent, and a color gamut of the display device may be increased by reducing the FWHM.

FIG. 18 is a conceptual view illustrating a process in which light travels when a tube type composite 1440 is applied to a backlight unit 1400.

An LED 1410 emits blue primary light 10a.

The composite 1440 emits three primary light using the primary light 10a. As described above with reference to FIG. 11, the composite 1440 may include a quantum dot phosphor 1041 (please refer to FIG. 11), a dispersing agent 1042 (please refer to FIG. 11), a matrix 1043 (please refer to FIG. 11), and an optical agent 1044 (please refer to FIG. 11). In another example, as described above with reference to FIG. 16, the composite may include a quantum dot phosphor 1241 (please refer to FIG. 16), a dispersing agent 642 (please refer to FIG. 16), a matrix 1243 (please refer to FIG. 16), and beads 1245 (please refer to FIG. 16) in which the optical agent 1244 (please refer to FIG. 16) is dispersed.

When the quantum dot phosphor, the dispersing agent, and the optical agent (or the beads in which the optical agent is dispersed) are dispersed in a resin and cured in the form of a film or a tube, a film or tube type composite is formed. The resin is a matrix as described above.

As a resin for dispersing the quantum dot phosphor and the dispersing agent, a thermosetting resin, a photocurable resin, or a dry-curable resin may be used. The thermosetting resin and the photocurable resin are used, the resin is cured using heat and light. When the dry-curable resin is used, a quantum dot phosphor and a dispersing agent may be dispersed in a solvent and heat is applied thereto to cure the resin.

The composite 1440 illustrated in FIG. 18 is formed as a tube. The composite 1440 is disposed to be spaced apart from the LED 1410 to form a remote phosphor structure. Since the composite 1440 is disposed to be spaced apart from the LED 1410, a reduction in a lifespan of a quantum dot phosphor (not shown) due to heat from the LED 1410 may be restrained. The composite 1440 may be disposed between the LED 1410 and the light guide plate 1420.

The quantum dot phosphor (not shown) is excited by the primary light 10a to emit secondary light 20b and 20c having a wavelength different from that of the primary light 10a. A green light emission quantum dot phosphor (not shown) is excited by the blue primary light 10a to emit green secondary light 20b. A red light emission quantum dot phosphor (not shown) is excited by the blue primary light 10a to emit red secondary light 20c. The composite 1440 emits the blue primary light 10a, the green secondary light 20b, and the red secondary light 20c. The backlight unit 1400 may emit white light by combining the blue primary light 10a, the green secondary light 20b, and the red secondary light 20c.

An optical agent (not shown) absorbs light having a specific wavelength from the primary light or the secondary light such that an FWHM of the peak in the optical spectrum is reduced. Unlike the case of FIG. 17, the quantum dot phosphor and the optical agent form a single component called the composite 1440. the FWHM of the peak in the optical spectrum may be reduced by the optical agent.

The light guide plate 1420 guides the primary light 10a and the secondary lights 20b and 20c. A reflective plate 1430 reflects the primary light 10a and the secondary lights 20b and 20c, and the reflected primary light 10a and the secondary lights 20b and 20c pass through the light guide plate 1420 and are incident to an optical sheet 1450

Hereinafter, a FWHM of a peak varied in an optical spectrum by an optical agent will be described.

Figure 19A:
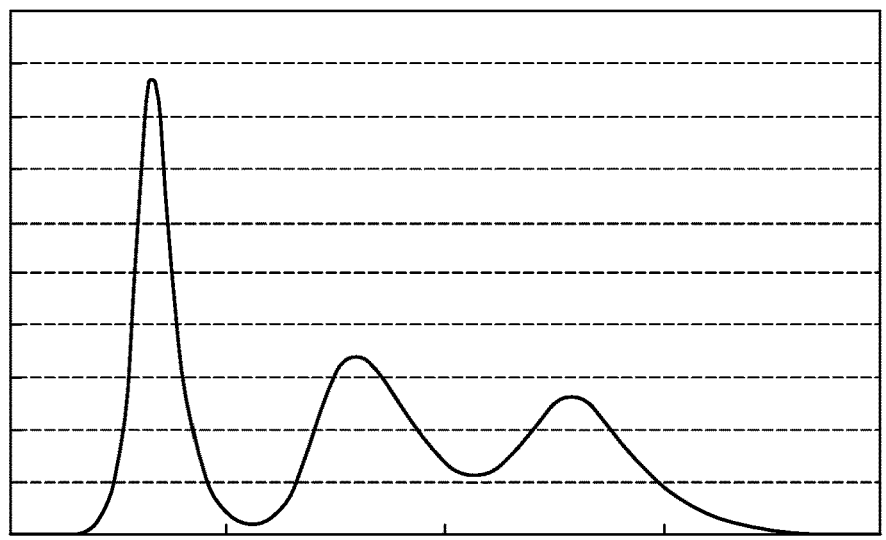
FIG. 19A is a view of an optical spectrum illustrating a color gamut in a display device without using an optical agent.
Figure 19B:
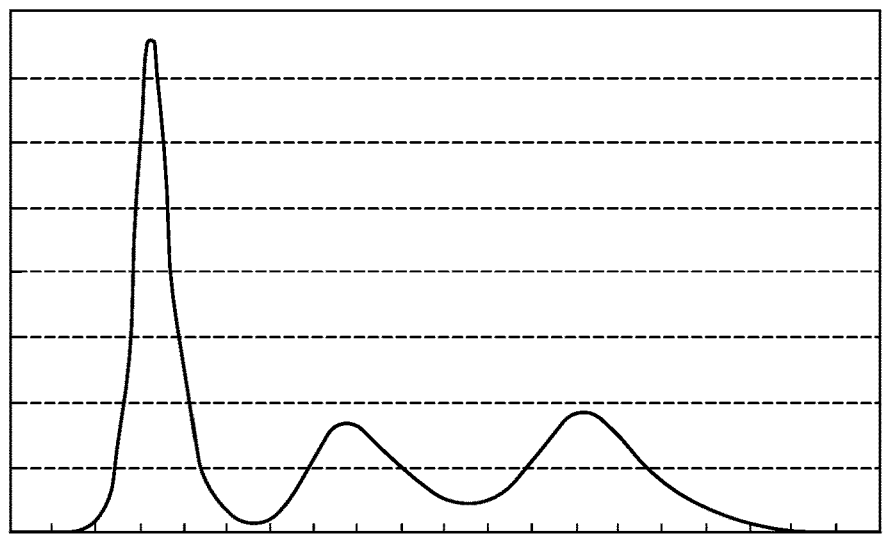
FIG. 19B is a view of an optical spectrum illustrating a color gamut in a display device using an optical agent.

FIG. 19A is a view of an optical spectrum illustrating a color gamut in a display device without using an optical agent, and FIG. 19B is a view of an optical spectrum illustrating a color gamut in a display device using an optical agent.

In each spectrum, the horizontal axis represents a wavelength of light, and the vertical axis represents transmissivity. In each spectrum, three peaks are observed in which peaks of blue light, green light, and red light are sequentially illustrated from the left to the right.

When FIGS. 19A and 19B are compared, it can be visually confirmed that, as the optical agent is used, transmissivity of light corresponding to a portion between the peak of green light and the peak of red light is reduced and FWHMs of the peak of green light and peak of red light are reduced. A color gamut of the display device corresponding to FIG. 19A is about 120%, and a color gamut of the display device corresponding to FIG. 19B is about 130%

In this manner, in the present disclosure, a FWHM of a peak in an optical spectrum may be reduced using the optical agent including a dye, a pigment, or a luminescent dye. Since the FWHM of the peak is reduced, the present disclosure may implement a wide color gamut of a display device.

In order to secure a color gamut of 130% or greater in the future, technical development of reducing scattering of quantum dot phosphors should be made. However, technical difficulty is too high to reduce scattering of the quantum dot phosphors in a manufacturing process similar to a batch type, and production yield is low.

The present disclosure overcomes such limitations by using the optical agent including a dye, a pigment, or a luminescent dye and proposes a method for increasing a color gamut of a display device.

As for the backlight unit and the display device having the same according to the present disclosure, the configuration and method according to the exemplary embodiments of the present disclosure described above are not limited in its application, but the entirety or a portion of the exemplary embodiments may be selectively combined to be configured into various modifications.

The present disclosure may be used in various industrial fields related to a display device for displaying image information and a backlight unit as a component of the display device.

The invention claimed is:

1. A backlight unit comprising:
a light source formed to provide primary light;
a quantum dot phosphor excited by the primary light provided from the light source to emit secondary light having a wavelength different from a wavelength of the primary light and disposed to be spaced apart from the light source;
an optical agent absorbing light having a specific wavelength from the primary light provided by the light source and the secondary light emitted from the quantum dot phosphor; and
a matrix configured to support the quantum dot phosphor and the optical agent, wherein
the quantum dot phosphor and the optical agent are randomly mixed in the matrix, and
the quantum dot phosphor, the optical agent, and the matrix form a composite.

2. The backlight unit of claim 1, wherein
the optical agent includes:
at least one of a dye absorbing or reflecting light having a specific wavelength;
a pigment absorbing or reflecting light having a specific wavelength; and
a luminescent dye absorbing light having a specific wavelength and emitting light having a wavelength longer than that of the absorbed light.

3. The backlight unit of claim 2, wherein the optical agent includes dyes or pigments coloring red, green, or purple.

4. The backlight unit of claim 3, wherein the red coloring dye or pigment reflects light with 620-650 nm, green coloring dye or pigment reflects light with 520-550 nm, blue coloring dye or pigment reflects light with 440-460 nm, and purple coloring dye or pigment reflects light with 400-460 nm.

5. The backlight unit of claim 2, wherein
the dye or pigment absorbs light with 480-520 nm, 540-630 nm, or 650 nm or greater.

6. The backlight unit of claim 2, wherein
the optical agent includes luminescent dyes absorbing light with 480-520 nm, 540-630 nm, or 650 nm or greater, and emitting light with 620-650 nm, 520-550 nm, 440-460 nm, or 400-460 nm.

7. The backlight unit of claim 1, wherein
the light source is disposed on one surface of a printed circuit board (PCB), and
the composite is provided in the form of a film, provided in a position spaced apart from the PCB, and disposed to face the light source.

8. The backlight unit of claim 1, further comprising:
a light guide plate guiding light provided from the light source,
wherein
the light source is disposed on the edge of the light guide plate, and
the composite is provided in the form of a tube and disposed between the light source and the light guide plate.

9. The backlight unit of claim 1, wherein
the backlight unit further includes a light guide plate guiding light provided from the light source,
the light source is disposed on the edge of the light guide plate, and
the composite is provided in the form of a film and disposed to face one surface of the light guide plate.

10. The backlight unit of claim 1, further comprising:
a first matrix configured to support the quantum dot phosphor; and
a second matrix configured to support the optical agent, wherein
the quantum dot phosphor and the first matrix form a quantum dot phosphor film or a quantum dot phosphor tube,
the optical agent and the second matrix form an optical film, and
the optical film is stacked on the quantum dot phosphor film or the quantum dot phosphor tube.

11. The backlight unit of claim 10, wherein
the light source is disposed on one surface of a printed circuit board (PCB),
the quantum dot phosphor film is provided in a position spaced apart from the PCB and disposed to face the light source, and
the optical film is disposed on the opposite side of the light source with respect to the first matrix.

12. The backlight unit of claim 10, further comprising:
a light guide plate guiding light provided from the light source,
the light source is disposed on the edge of the light guide plate,
the quantum dot phosphor tube is disposed to face one surface of the light guide plate, and
the optical film is disposed on the opposite side of the light guide plate with respect to the quantum dot phosphor tube.

13. The backlight unit of claim 10, further comprising:
a light guide plate guiding light provided from the light source,
wherein
the light source is disposed on the edge of the light guide plate,
the quantum dot phosphor film is disposed to face one surface of the light guide plate, and
the optical film is disposed on the opposite side of the light guide plate with respect to the quantum dot phosphor film.

14. A backlight unit comprising:
a light source formed to provide primary light;
a quantum dot phosphor excited by the primary light provided from the light source to emit secondary light having a wavelength different from a wavelength of the primary light and disposed to be spaced apart from the light source;
an optical agent absorbing light having a specific wavelength from the primary light and the secondary light;
a bead configured to support the quantum dot phosphor and the optical agent; and
a matrix configured to support the bead, wherein the bead includes the quantum dot phosphor and the optical agent and forms a composite together with the matrix.

15. The backlight unit of claim 14, wherein
the light source is disposed on one surface of a printed circuit board (PCB),
the composite is provided in the form of a film, provided in a position spaced apart from the PCB, and disposed to face the light source.

16. The backlight unit of claim 14, further comprising:
a light guide plate guiding light provided from the light source,
wherein
the light source is disposed on the edge of the light guide plate, and
the composite is provided in the form of a tube and disposed between the light source and the light guide plate.

17. The backlight unit of claim 14, further comprising:
a light guide plate guiding light provided from the light source,
wherein
the light source is disposed on the edge of the light guide plate, and
the composite is provided in the form of a film and disposed to face one surface of the light guide plate.

18. A display device comprising:
a liquid crystal panel; and
a backlight unit emitting light to a rear side of the liquid crystal panel,
wherein the backlight unit includes:
a light source providing primary light;
a quantum dot phosphor exciting the primary light provided from the light source to emit secondary light having a wavelength different from a wavelength of the primary light, and disposed to be spaced apart from the light source; and
an optical agent absorbing light having a specific wavelength from the primary light provided by the light source and the secondary light emitted from the quantum dot phosphor; and
a matrix configured to support the quantum dot phosphor and the optical agent, wherein
the quantum dot phosphor and the optical agent are randomly mixed in the matrix, and
the quantum dot phosphor, the optical agent, and the matrix form a composite.

* * * * *